United States Patent
Gajewski

(10) Patent No.: US 9,589,126 B2
(45) Date of Patent: Mar. 7, 2017

(54) LOCK CONTROL METHOD AND ELECTRONIC DEVICE THEREOF

(71) Applicant: Samsung Electronics Co., Ltd., Gyeonggi-do (KR)

(72) Inventor: Michal Lukasz Gajewski, Poznan (PL)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 49 days.

(21) Appl. No.: 14/680,162

(22) Filed: Apr. 7, 2015

(65) Prior Publication Data

US 2015/0286814 A1 Oct. 8, 2015

(30) Foreign Application Priority Data

Apr. 7, 2014 (KR) .................. 10-2014-0041210

(51) Int. Cl.
*G06F 21/36* (2013.01)

(52) U.S. Cl.
CPC .................. *G06F 21/36* (2013.01)

(58) Field of Classification Search
CPC .......... G06F 21/36; G06F 3/04; G06F 3/0483; G06F 3/0484; H04W 12/08; H04W 12/06
See application file for complete search history.

(56) References Cited

U.S. PATENT DOCUMENTS

| | | | |
|---|---|---|---|
| 7,657,849 B2 | 2/2010 | Chaudhri et al. | |
| D621,849 S | 8/2010 | Anzures et al. | |
| 8,046,721 B2 | 10/2011 | Chaudhri et al. | |
| 8,136,053 B1 | 3/2012 | Miller et al. | |
| 8,694,791 B1* | 4/2014 | Rohrweck | G06F 21/36 455/418 |
| 2011/0298691 A1* | 12/2011 | DeLuca | G06F 21/36 345/1.3 |
| 2012/0220264 A1* | 8/2012 | Kawabata | G06F 3/04883 455/411 |
| 2013/0328778 A1* | 12/2013 | Chen | G06F 3/0488 345/163 |
| 2014/0092039 A1* | 4/2014 | Ito | G06F 21/36 345/173 |

(Continued)

OTHER PUBLICATIONS

Beton, Michael, Vincent Marie, and Christophe Rosenberger. "Biometric secret path for mobile user authentication: A preliminary study." Computer and Information Technology (WCCIT), 2013 World Congress on. IEEE, 2013.*

(Continued)

*Primary Examiner* — Chau Le
*Assistant Examiner* — Muhammad Chaudhry
(74) *Attorney, Agent, or Firm* — Cha & Reiter, LLC

(57) ABSTRACT

An electronic device having a lockscreen and a method implementing said lockscreen are disclosed herein, the electronic device including a display, a memory, and one or more processors configured to execute the method, the method including displaying a lockscreen pattern on the display including movable points repositionable in response to a drag input, and fixed points that are stationary, detecting drag inputs moving the movable points within the lockscreen pattern, and unlocking the electronic device if the detected drag inputs moving the movable points matches a pre-specified unlock condition stored in the memory.

18 Claims, 22 Drawing Sheets

(56) References Cited

U.S. PATENT DOCUMENTS

| | | | |
|---|---|---|---|
| 2014/0100026 A1* | 4/2014 | Seo | A63F 13/10 |
| | | | 463/29 |
| 2014/0137049 A1* | 5/2014 | Jung | H04W 12/06 |
| | | | 715/847 |
| 2014/0267120 A1* | 9/2014 | Zhang | G06F 3/0484 |
| | | | 345/173 |
| 2015/0186028 A1* | 7/2015 | Singer | G06F 3/04883 |
| | | | 715/744 |

OTHER PUBLICATIONS

De Luca, Alexander, et al. "Touch me once and i know its you!: implicit authentication based on touch screen patterns." Proceedings of the SIGCHI Conference on Human Factors in Computing Systems. ACM, 2012.*

Kim, David, et al. "Multi-touch authentication on tabletops." Proceedings of the SIGCHI Conference on Human Factors in Computing Systems. ACM, 2010.*

Emanuel Von Zezschwitz, Anton Koslow, Alexander De Luca, & Heinrich Hussmann. Making Graphic-Based Authentication Secure Against Smudge Attacks, Media Informatics Group, University of Munich, Amalienstr. 17, 80333 Munich, Germany. pp. 277-286. IUI '13, Mar. 19-22, 2013, Santa Monica, CA, USA.

* cited by examiner

LOCK CONTROL METHOD AND ELECTRONIC DEVICE THEREOF

CROSS-REFERENCE TO RELATED APPLICATION

This application claims priority under 35 U.S.C. §119(a) to Korean Application Serial No. 10-2014-0041210, which was filed in the Korean Intellectual Property Office on Apr. 7, 2014, the entire content of which is hereby incorporated by reference.

TECHNICAL FIELD

The present disclosure relates to a technology for a pattern-based unlock function within an electronic device.

BACKGROUND

Electronic devices have been developed as multimedia devices that provide various services such as a voice and video call function, information input/output function, and data transmission/reception.

Since the electronic devices store information including personal information in memory, a security functions may be set to limit access to electronic devices.

SUMMARY

According to various embodiments, an electronic device may provide an apparatus and a method for releasing a lockscreen through the use of a pattern.

According to various embodiments, an electronic device may provide an apparatus and a method for releasing a lockscreen based on a plurality of drag inputs within a lockscreen pattern.

According to various embodiments, an electronic device may provide an apparatus and a method for displaying change or folding of a lockscreen pattern according to a plurality of drag inputs made within the lockscreen pattern.

In one aspect of this disclosure, a method for a lockscreen in an electronic device is disclosed herein, including displaying a lockscreen pattern including movable points repositionable in response to a drag input, and fixed points that are stationary, detecting drag inputs moving the movable points within the lockscreen pattern, and unlocking the electronic device if the detected drag inputs moving the movable points matches a pre-specified unlock condition.

In one aspect of this disclosure, an electronic device is disclosed, including a display, a memory, and one or more processors configured to execute operations of displaying a lockscreen pattern on the display including movable points repositionable in response to a drag input, and fixed points that are stationary, detecting drag inputs moving the movable points within the lockscreen pattern, and unlocking the electronic device if the detected drag inputs moving the movable points matches a pre-specified unlock condition stored in the memory.

In one aspect of this disclosure, a computer readable recording medium storing program is provided, the program executable to conduct operations including displaying a lockscreen pattern including movable points repositionable in response to a drag input, and fixed points that are stationary, detecting drag inputs moving the movable points within the lockscreen pattern, and unlocking the electronic device if the detected drag inputs moving the movable points matches a pre-specified unlock condition.

BRIEF DESCRIPTION OF THE DRAWINGS

The present disclosure will be more apparent from the following detailed description taken in conjunction with the accompanying drawings, in which.

DETAILED DESCRIPTION

Figure 1:
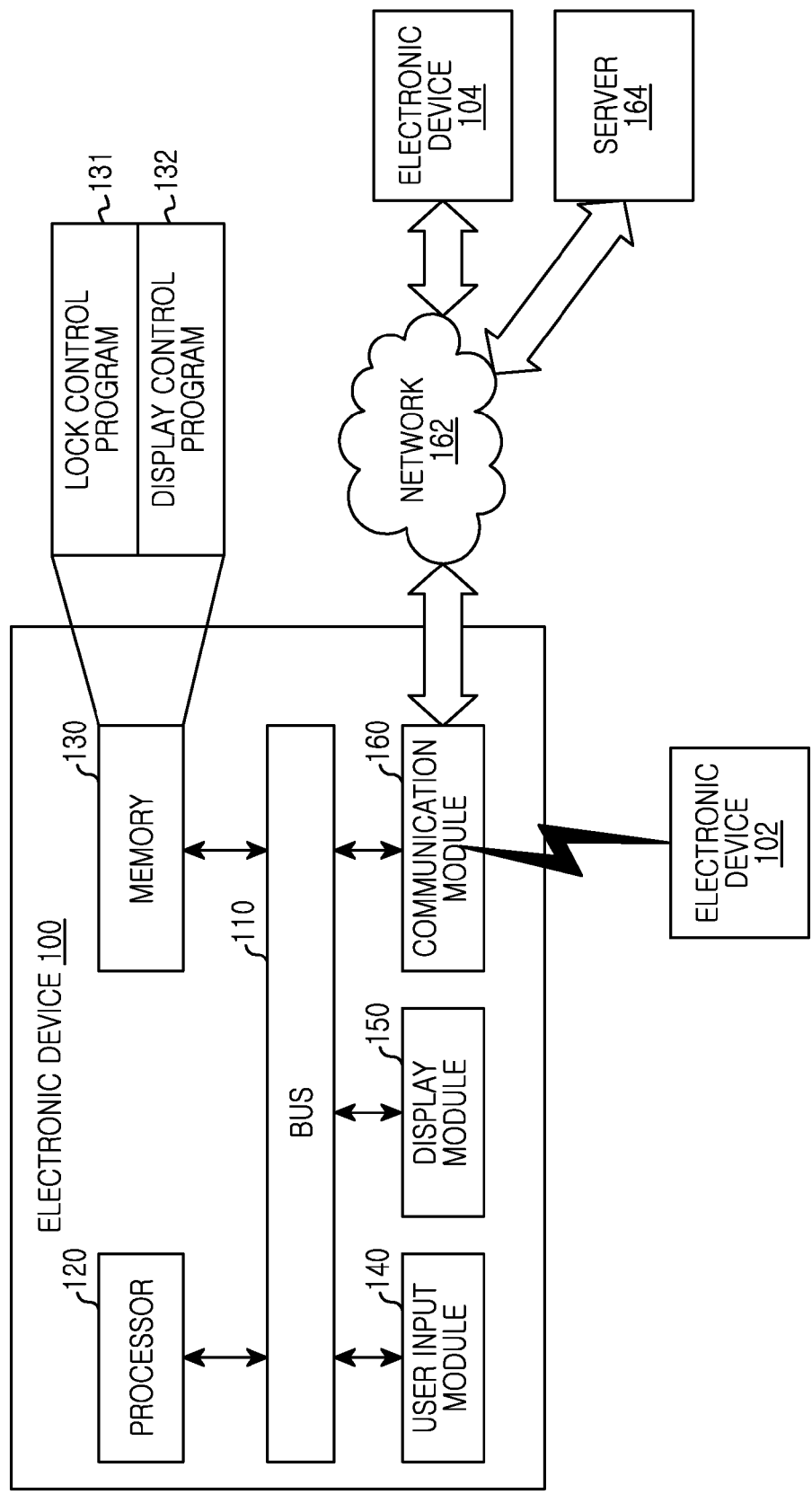
FIG. 1 is a block diagram of an electronic device according to various embodiments of the present disclosure.

Hereinafter, various embodiments will be described with reference to the accompanying drawings. Although specific embodiments are illustrated in the drawings and related detailed descriptions are discussed in the present disclosure, the present disclosure may have various modifications and several embodiments. Accordingly, the present disclosure is not limited to a specific implementation form and it should be understood that the present disclosure includes all changes or equivalents and substitutes for the present disclosure. In connection with descriptions of the drawings, similar components are designated by the same reference numeral.

For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appcessary, a camera, a wearable device, an electronic clock, a wrist watch, a home appliance (for example, refrigerator, air conditioner, cleaner, an artificial intelligence robot, a TeleVision (TV), a Digital Video Disk (DVD) player, an audio player, oven, microwave oven, washing machine, air cleaner, and electronic picture frames), various types of medical devices (for example, Magnetic Resonance Angiography (MRA), Magnetic Resonance Imaging (MRI), Computed Tomography (CT), scanner, an ultrasonic device, and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a vehicle infotainment device, electronic equipment for a ship (for example, a navigation device for ship, a gyro compass, and the like), avionics, a security device, electronic clothes, an electronic key, a camcorder, game consoles, a Head-Mounted Display (HMD), a flat panel display device, an electronic frame, an electronic album, furniture or a part of buildings/structures having a communication function, an electronic board, an electronic signature receiving device, a wearable device, and a projector. It is obvious to those skilled in the art that the electronic device according to the present disclosure is not limited to the aforementioned devices. It is obvious to those skilled in the art that the electronic device according to the present disclosure is not limited to the aforementioned devices.

FIG. 1 is a block diagram of an electronic device according to various embodiments.

Referring to FIG. 1, an electronic device 100 may include a bus 110, a processor 120, a memory 130, a user input module 140, a display module 150, or a communication module 160.

The bus 110 may be a circuit for connecting components (for example, the bus 110, the processor 120, the memory 130, the user input module 140, the display module 150, or the communication module 160) included in the electronic device 100 and transferring communication (for example, control messages) between the components.

Figure 2:
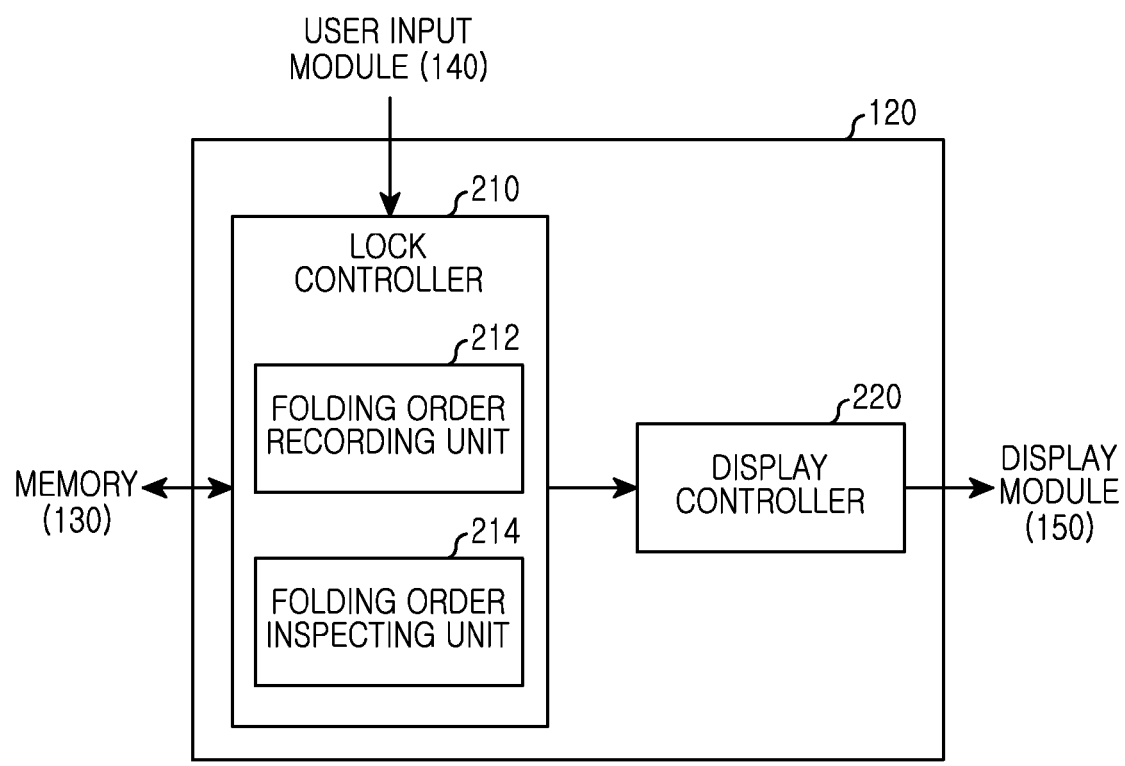
FIG. 2 is a block diagram illustrating in detail a processor according to various embodiments of the present disclosure.

The processor 120 may receive commands from the components included in the electronic device 100 through the bus 110, analyze the received commands, and perform calculations or data processing according to the analyzed commands. At this time, the processor 120 may execute one or more applications stored in the memory 130 and make a control to provide services according to the corresponding applications. For example, the processor 120 may be configured as illustrated in FIG. 2 to control a frame rate of a display by executing a lock control program 131 and a display control program 132.

The processor 120 may include one or more Application Processors (APs) or one or more Communication Processors (CPs). The AP and the CP may be included in the processor 120 or may be included in different IC packages, respectively. Further, the AP and the CP may be included in one IC package. The AP may control a plurality of hardware or software components connected to the AP by driving an operating system or an application program and perform processing of various pieces of data including multimedia data and calculations. The AP may be implemented by a System on Chip (SoC). The CP may perform at least some of the multimedia control functions. Further, the CP may distinguish between and authenticate terminals within a communication network by using a subscriber identification module (for example, a SIM card). At this time, the CP may provide a user with services including a voice call, a video call, a short message service, and packet data. Further, the CP may control data transmission/reception of the communication module 160. The AP or the CP may load commands or data received from at least one of a non-volatile memory and other components connected to each of the AP and the CP in a volatile memory, and may process the loaded commands or data. Further, the AP or the CP may store data received from or generated by at least one of other components in a non-volatile memory. The CP may manage a data link in communication between an electronic device including hardware and other electronic devices connected to the electronic device through a network and may perform a function of switching a communication protocol. The CP may be implemented by the SoC. The processor 120 may further include a Graphic Processing Unit (GPU).

The memory 130 may store commands or data received from the processor 120 or other components (for example, the user input module 140, the display module 150, or the communication module 160) or generated by the processor 120 or other components. At this time, the memory may include an internal buffer and an external buffer.

Further, the memory 130 may include the lock control program 131 and the display control program 132. At this time, each application may include a programming module, and each programming module may include software, firmware, hardware, or a combination of two or more thereof.

The lock control program 131 may include at least one software component for setting a pattern for unlocking based on a plurality of drags. For example, the lock control program 131 may determine a pattern release value based on coordinates of positions along which a point is moved according to a user's control on a pattern setting screen. In another example, the lock control program 131 may determine a pattern release value based on coordinates and orders of positions to which points have moved according to a user's control on a pattern setting screen. In another example, the lock control program 131 may determine a pattern release value based on a coordinate of a point according to a user's control on a pattern setting screen.

Further, the lock control program 131 may include at least one software component for determining unlocking based on a plurality of drags for a pattern displayed on a lock screen. For example, the lock control program 131 may determine unlocking based on coordinates of positions along which a point is moved according to a user's control in the pattern displayed on the lock screen. In another example, the lock control program 131 may determine unlocking based on coordinates and orders of positions to which points have moved according to a user's control in the pattern displayed on the lock screen. In another example, the lock control program 131 may determine unlocking based on a coordinate of a point according to a user's control on the lock screen.

The display control program 132 may include at least one software component for making a control to display at least one piece of display data through the display module 150. For example, the display control program 132 may display the pattern setting screen through the display module 150 according to a control of the lock control program 131. In another example, the display control program 132 may display the lock screen including a pattern through the display module 150 according to a control of the lock control program 131. At this time, the display control program 132 may display the pattern setting screen including a plurality of movable points or fixed points. The movable points may be moved responsive to an input, such as a touch-based drag gesture. That is, a touch gesture dragging one of the movable points may reposition the movable point according to a release point of the touch gesture. The fixed points may be fixed or otherwise stationary so as to not be moveable in response to any touch input. The touch input may be, for example, a single touch input, or a multi-touch input implementing any conventional gesture, such as a drag gesture.

Further, the memory 130 may include an internal memory or an external memory. The internal memory may include at least one of a volatile memory (for example, a Dynamic Random Access Memory (DRAM), a Static RAM (SRAM), or a Synchronous Dynamic RAM (SDRAM)) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory). At this time, the internal memory may be a Solid State Drive (SSD) type. The external memory may include at least one of a Compact Flash (CF), a Secure Digital (SD), a Micro Secure Digital (Micro-SD), a Mini Secure Digital (Mini-SD), an extreme Digital (xD) and a memory stick.

The memory 130 may further include a kernel, middleware, and an Application Programming Interface (API). The kernel may control or manage system resources (for example, the bus 110, the processor 120, or the memory 130) used for executing operations or functions implemented in the remaining other programming modules (for example, the middleware, the API, or applications). Further, the kernel may provide an interface through which the middleware, API, or applications may access individual components of the electronic device 100 to control or manage the components. The middleware may serve to mediate between the API or applications and the kernel so that they can communicate to exchange data with each other. Further, the middleware may perform load balancing for operation requests received from one or more applications by using a method of assigning priorities to the operation requests to first use system resources (for example, the bus 110, the processor 120, or the memory 130) of the electronic device 100. The API corresponds to an interface through which applications can control functions provided from the kernel or middleware, and may include at least one interface or function for performing file control, window control, image processing, or text control.

The user input module 140 may receive commands or data from the user and transmit the received commands or data to the processor 120 or the memory 130 through the bus 110. For example, the user input module 140 may include a touch panel, a pen sensor, a key, or an ultrasonic input device. For example, the touch panel may recognize a touch input through at least one type of, for example, a capacitive type, a resistive type, an infrared type, and an ultrasonic type. The touch panel may further include a controller. In the capacitive type, the touch panel may recognize proximity (hovering) as well as a direct touch. The touch panel may further include a tactile layer. At this time, the touch panel may provide the user with a tactile reaction. For example, the pen sensor may be implemented using a method identical or similar to a method of receiving a touch input of a user, or using a separate recognition sheet. For example, the key may include a keypad or a touch key. For example, the ultrasonic input device may be a device which can identify data by detecting sound waves by a microphone of the electronic device through a pen generating an ultrasonic signal and may perform radio recognition.

The display module 150 may display an image, a video, or data for the user. For example, the display module 150 may include a panel or hologram. For example, the panel may be a Liquid Crystal Display (LCD) or an Active Matrix Organic Light Emitting Diode (AM-OLED). Further, the panel may be implemented to be, for example, flexible, transparent, or wearable. The panel may be implemented by one module together with the touch panel. For example, the hologram may show a three-dimensional image in the air using interference of light. In addition, the display module 150 may further include a control circuit for controlling the panel or the hologram.

The display module 150 may display data according to a control of a display control program 133.

The communication module 160 may connect communication between the electronic device 100 and other electronic devices 102 and 104. The communication module 160 may support a short-range communication protocol (for example, Wi-Fi, BlueTooth (BT), or Near Field Communication (NFC)), or network communication 162 (for example, Internet, Local Area Network (LAN), Wide Area Network (WAN), telecommunication network, cellular network, or satellite network, or a Plain Old Telephone Service or "POTS"). The network 162 may also connect to another server 164. Each of the electronic devices 102 and 104 may be a device which is the same as the electronic device 100 (for example, same type device) or another device (for example, different type device).

Additionally, the electronic device may further include a sensor module. The sensor module may include at least one of a gesture sensor, a gyro sensor, an atmospheric pressure sensor, a magnetic sensor, an acceleration sensor, a grip sensor, a proximity sensor, a Red, Greed, and Blue (RGB) sensor, a bio sensor, a temperature/humidity sensor, an illumination sensor, and Ultra Violet (UV) sensor. Further, the sensor module may measure a physical quantity or detect an operation state of the electronic device, and convert the measured or detected information to an electrical signal. For example, the sensor module may include an E-nose sensor, an electromyography (EMG) sensor, an electroencephalogram (EEG) sensor, an electrocardiogram (ECG) sensor, or a fingerprint sensor. The sensor module may further include a control circuit for controlling one or more sensors included in the sensor module.

The names of the above described hardware components according to various embodiments may vary depending on the type of electronic device. The hardware according to various embodiments may include at least one of the above described components, a few of the components may be omitted, or an additional component may be further included. Also, some of the hardware components according to various embodiments may be combined into one entity, which may perform functions identical to those of the relevant components before the combination.

FIG. 2 is a block diagram illustrating in detail the processor according to various embodiments.

As illustrated in FIG. 2, the processor 120 may include a lock controller 210 and a display controller 220.

The lock controller 210 may control a pattern setting for unlocking based on a plurality of drags by executing the lock control program 131 stored in the memory 130. For example, the lock controller 210 may determine a pattern release value based on coordinates of positions along which a point is moved according to a user's control on a pattern setting screen. In another example, the lock controller 210 may determine a pattern release value based on coordinates and orders of positions to which points have moved according to a user's control on a pattern setting screen. In still another example, the lock controller 210 may determine a pattern release value based on a coordinate of a point according to a user's control on a pattern setting screen.

The lock controller 210 may control unlocking based on a plurality of drags for a pattern displayed on a lock screen by executing the lock control program 131 stored in the memory 130. For example, the lock controller 210 may determine unlocking based on coordinates of positions along which a point is moved according to a user's control in the pattern displayed on the lock screen. In another example, the lock controller 210 may determine unlocking based on coordinates and orders of positions to which points have moved according to a user's control in the pattern displayed on the lock screen. In another example, the lock controller 210 may determine unlocking based on a coordinate of a point according to a user's control on the lock screen.

The lock controller 210 may further include a folder order recording unit 212 for setting an order in which movable points must be moved to fold the on-screen pattern and release the lockscreen. The lock controller 210 may also include a folder order inspecting unit 214 for detecting a lock release attempt and to determine whether the received folding order matches a pre-stored folder order.

The display controller 220 may make a control to display data through the display module 150 by executing the display control program 132 stored in the memory 130. For example, the display controller 220 may display the pattern setting screen through the display module 150 according to a control of the lock controller 210. In another example, the display controller 220 may display the lock screen including a pattern through the display module 150 according to a control of the lock controller 210. At this time, the display controller 220 may display the pattern setting screen including a plurality of movable points or fixed points.

According to various embodiments, an electronic device comprising a display, a memory, and one or more processors configured to execute operations of displaying a lockscreen pattern on the display including movable points repositionable in response to a drag input, and fixed points that are stationary, detecting drag inputs moving the movable points within the lockscreen pattern, and unlocking the electronic device if the detected drag inputs moving the movable points matches a pre-specified unlock condition stored in the memory.

According to various embodiments, the drag inputs are executed responsive to a multi-touch input.

According to various embodiments, the pre-specified unlock condition includes a pre-specified order for the drag inputs moving the movable points within the lockscreen pattern, and the electronic device is unlocked if an order of the detected drag inputs matches the pre-specified order.

According to various embodiments, the pre-specified unlock condition further includes pre-specified coordinates to which each of the plurality of drag inputs is moved, and the electronic device is unlocked if each of the detected drag inputs are moved to each of the pre-specified coordinates, in the order matching the pre-specified order.

According to various embodiments, the operations further include: in response to detecting a drag input moving a particular movable point, displaying folding of the displayed lockscreen pattern, wherein the folding is based on an initial coordinate of the particular moveable point and a direction in which the particular movable point is moved by the drag input.

According to various embodiments, the operations further including displaying at least one new movable point on the folded displayed lockscreen pattern.

According to various embodiments, the at least one new movable point is disposed along an axis of a fold of the folded displayed lockscreen pattern.

According to various embodiments, the at least one new movable point is displayed by converting at least one fixed point into the at least one new movable point.

According to various embodiments, the pre-specified unlock condition further comprises pre-specified source coordinates indicating particular movable points, and the electronic device is unlocked if the drag inputs move the particular movable points corresponding to the pre-specified source coordinates.

According to various embodiments, the pre-specified unlock condition further comprises pre-specified destination coordinates to which the particular movable points are to be moved, and the electronic device is unlocked if the drag inputs move the particular movable points from the pre-specified source coordinates to the pre-specified desintation coordinates.

Figure 3:
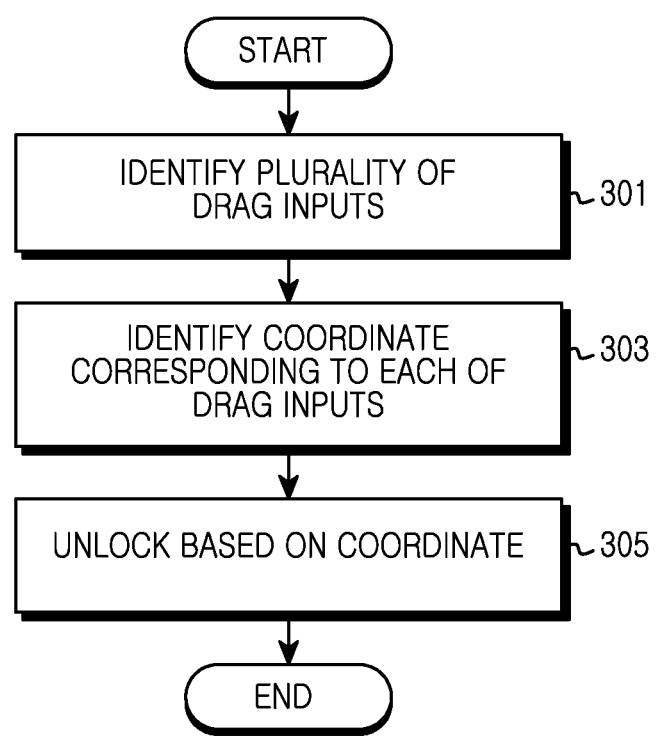
FIG. 3 illustrates a process for determining unlocking based on coordinates according to a plurality of drag inputs in an electronic device according to various embodiments of the present disclosure.

FIG. 3 illustrates a process for executing an unlock function based on coordinates of a plurality of drag inputs in the electronic device according to various embodiments of the present invention.

Figure 10A:
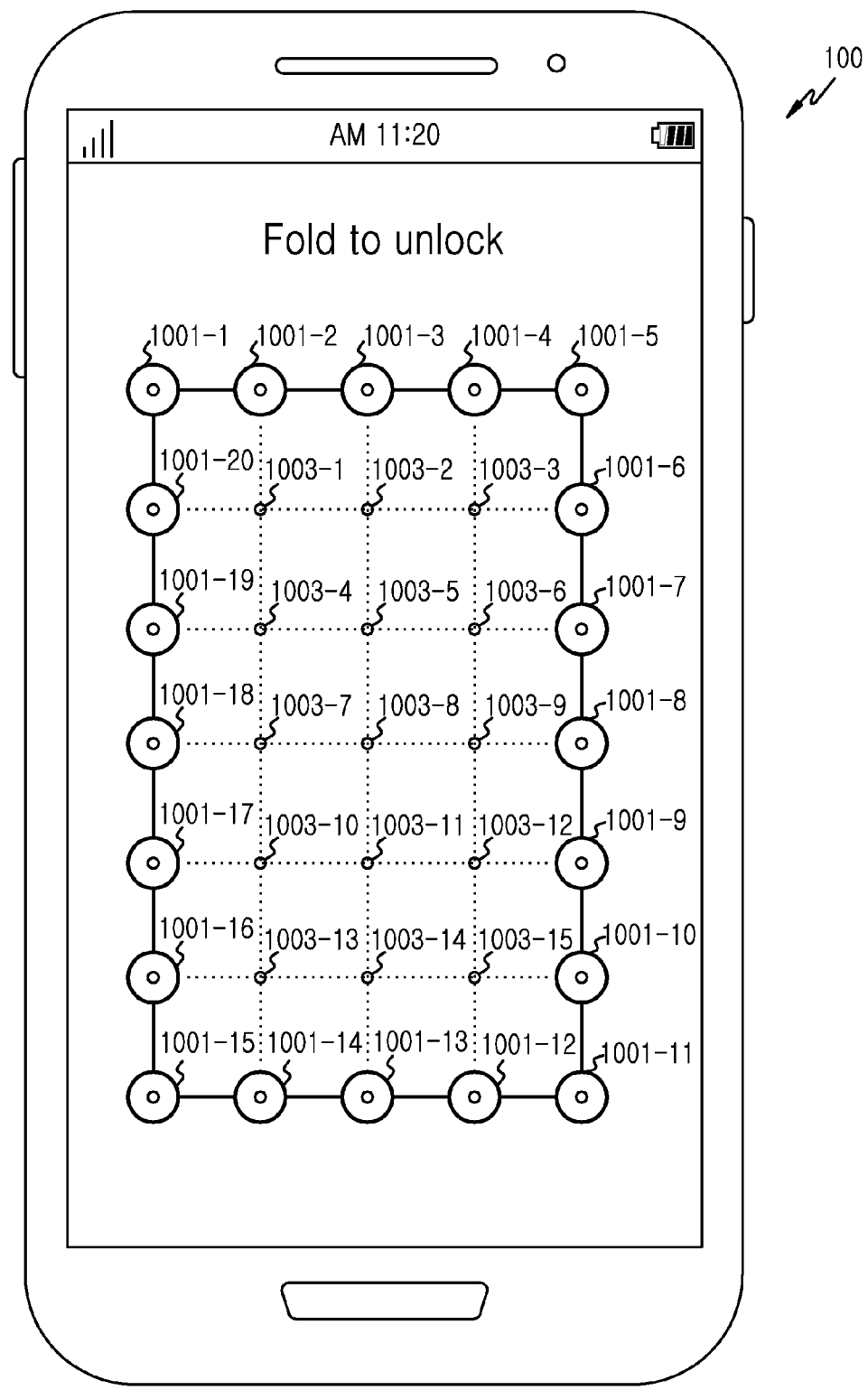
FIG. 10A, FIG. 10B, FIG. 10C, FIG. 10D, FIG. 10E and FIG. 10F illustrate screen configurations for setting or releasing a pattern in an electronic device according to various embodiments of the present disclosure.

Referring to FIG. 3, the electronic device may identify a plurality of drag inputs in step 301. For example, as illustrated in FIG. 10A, the electronic device may display a lock screen including a pattern including a plurality of movable points 1001-1 to 1001-20. The pattern displayed on the display may be a pattern pre-stored in the electronic device or a pattern defined by the user. At this time, the electronic device may identify whether one or more of the plurality of movable points 1001-1 to 1001-20 are moved by a user's control. The one or more of the plurality of movable points 1001-1 to 1001-20 may move to the plurality of movable points 1001-1 to 1001-20 or a plurality of fixed points 1003-1 to 1003-15.

Figure 10B:
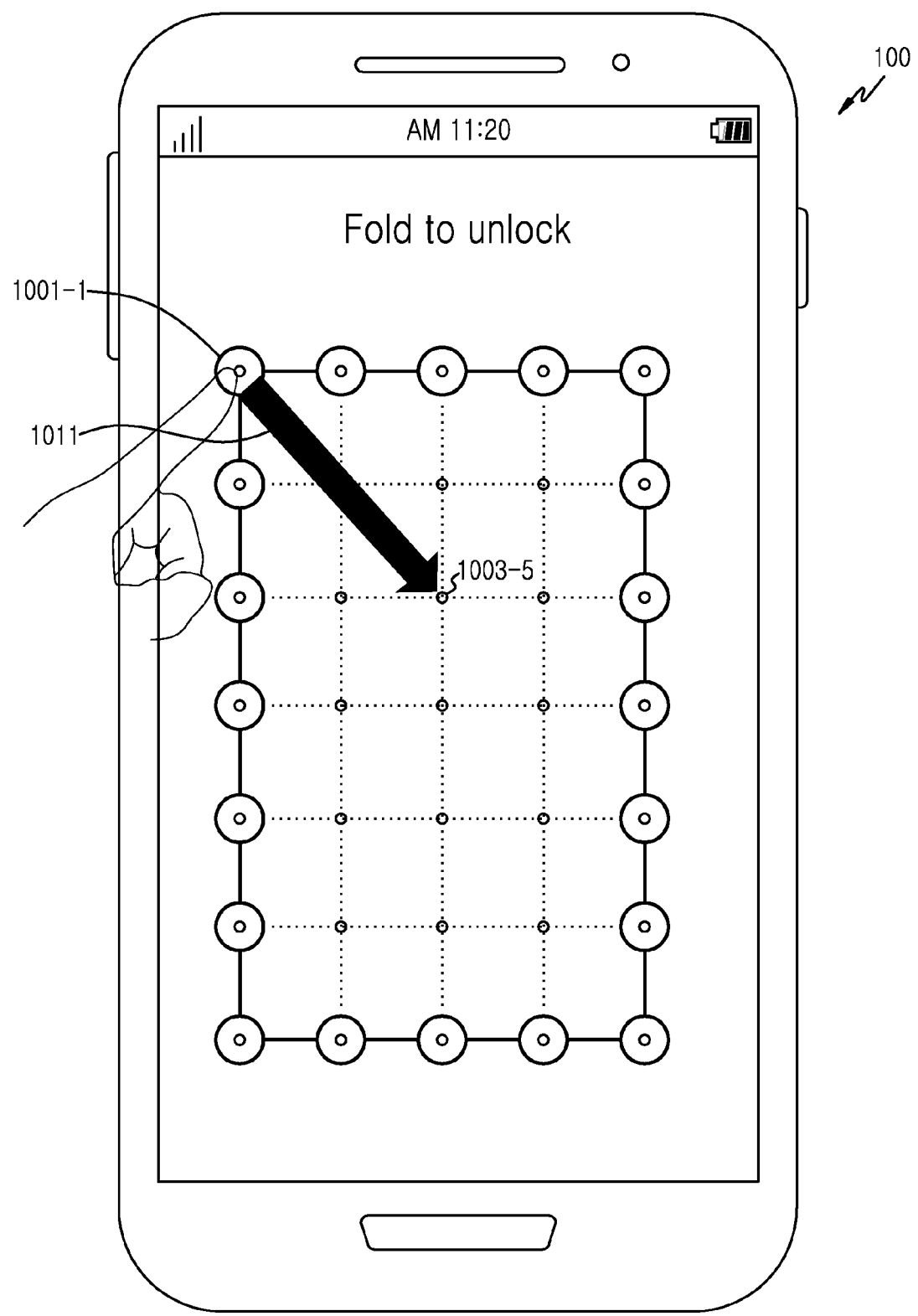
Figure 10C:
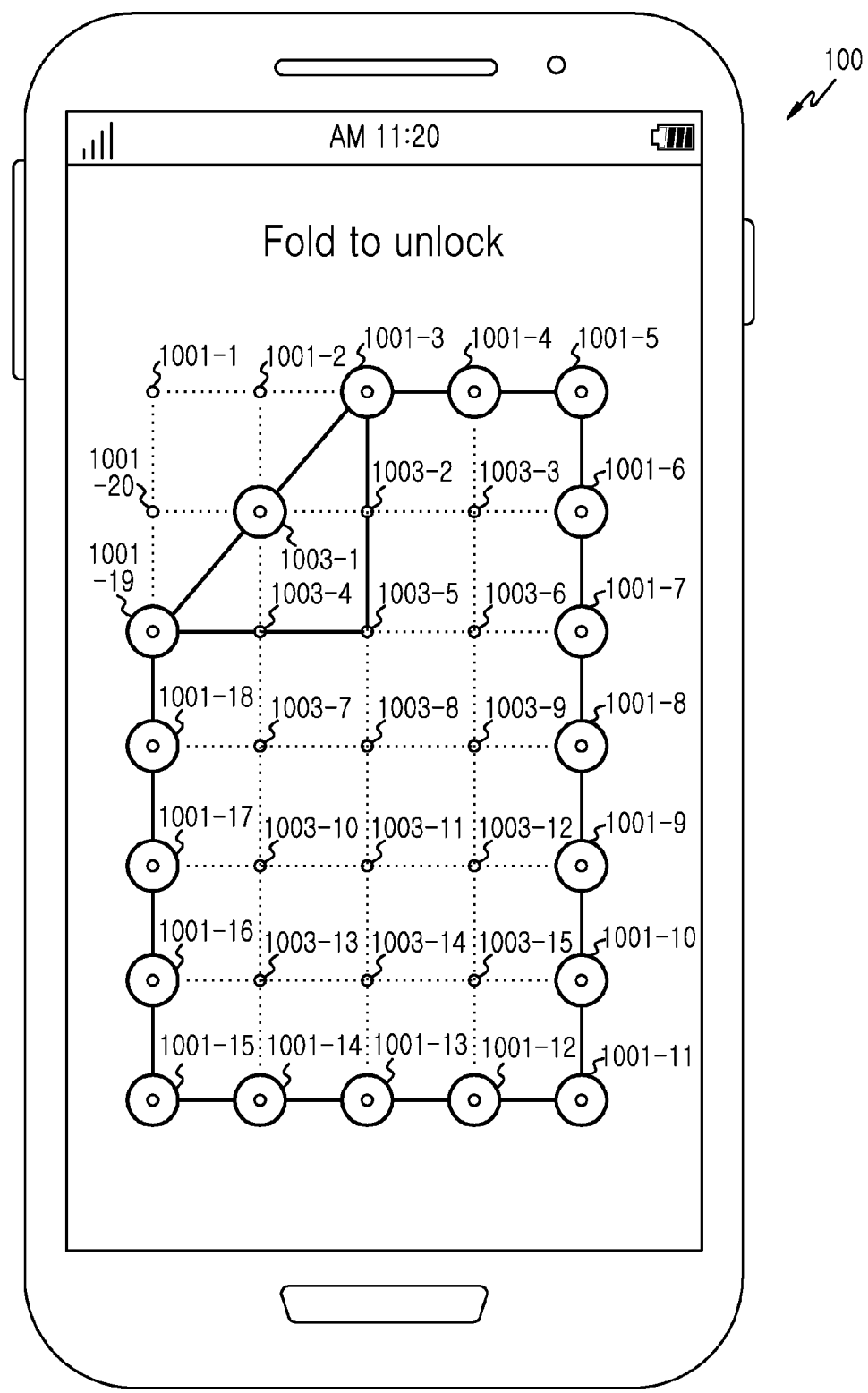
Figure 10D:
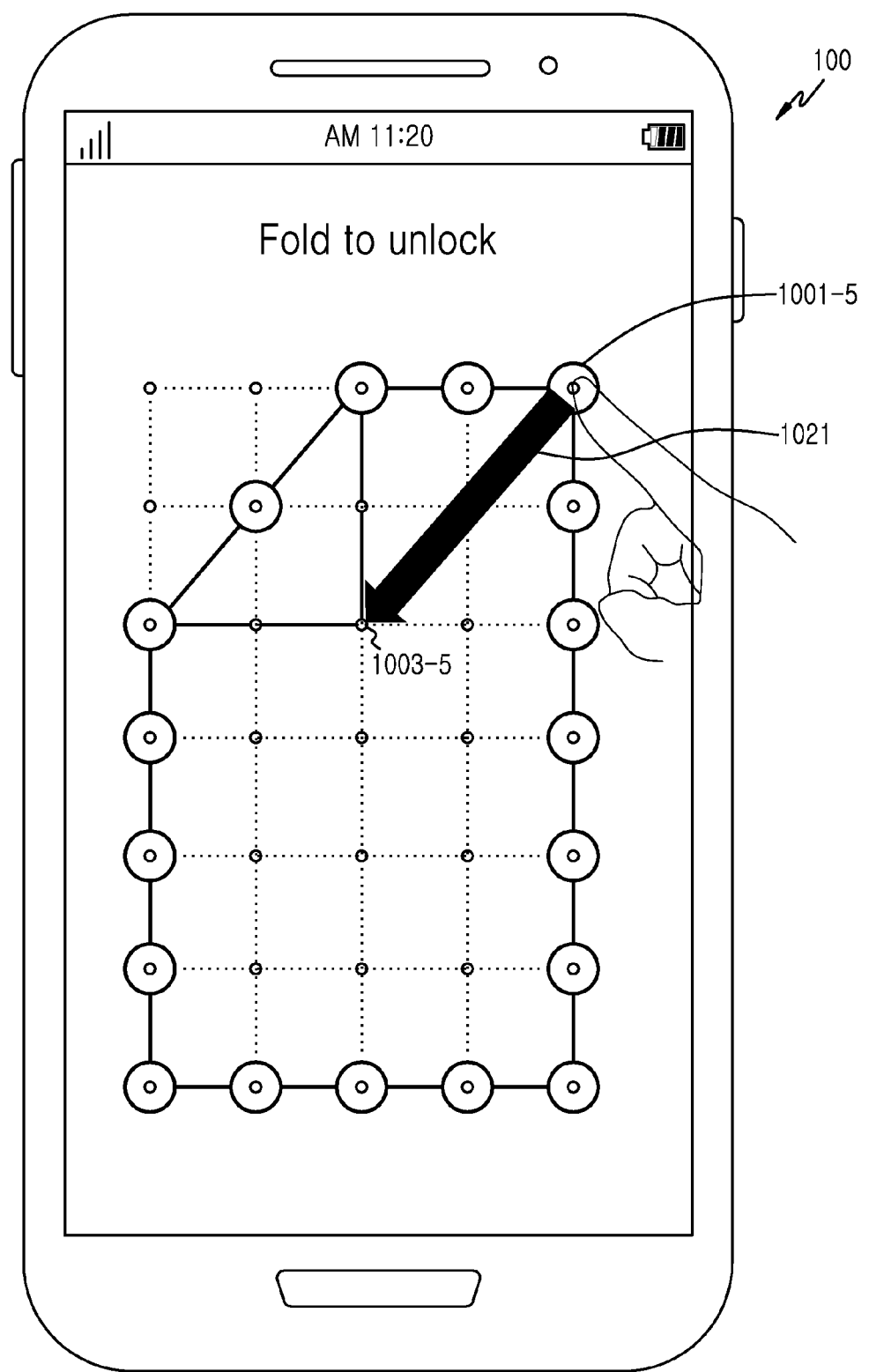
Figure 10E:
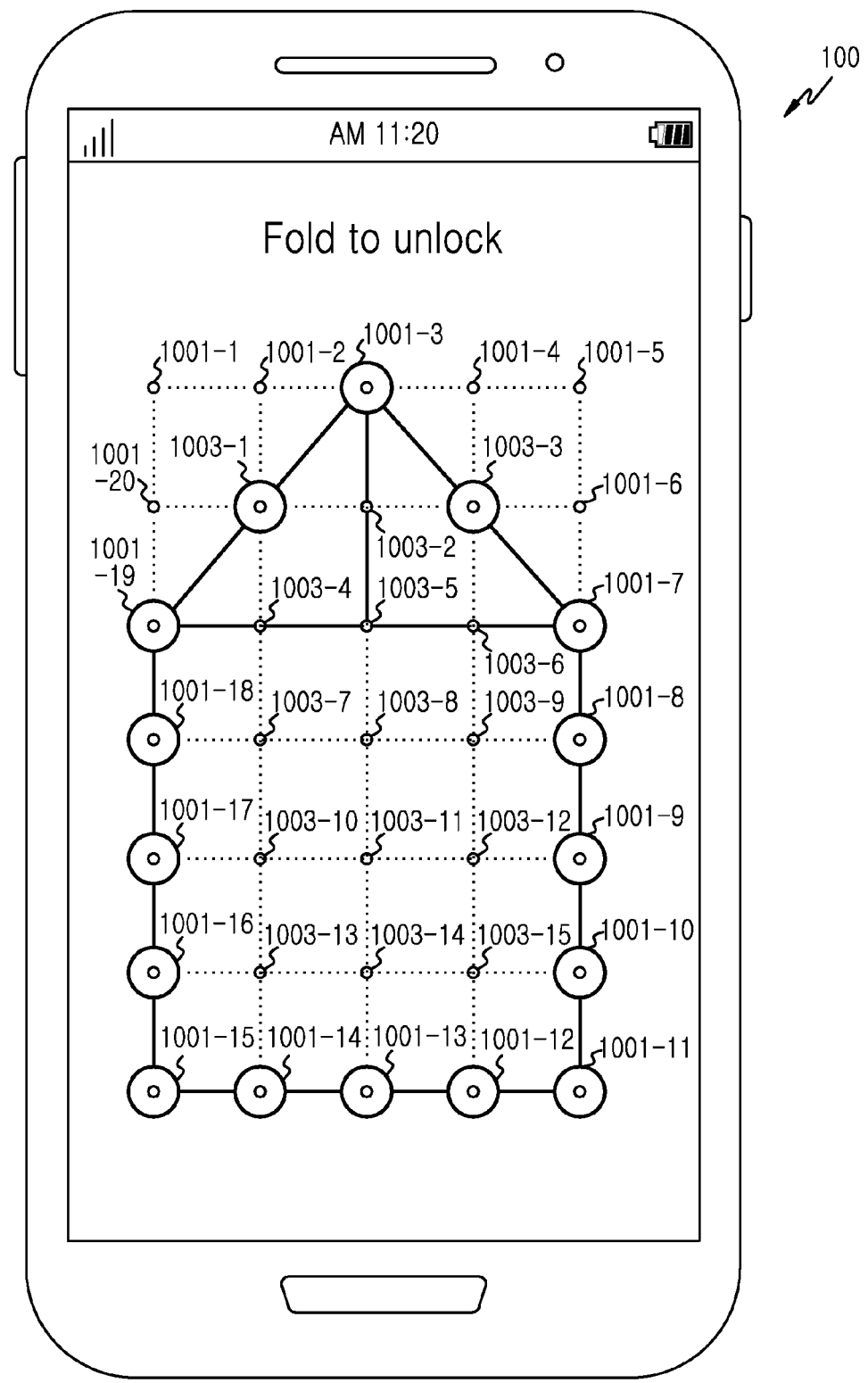

Thereafter, in step 303, the electronic device may identify a coordinate corresponding to each of the drag inputs. For example, as illustrated in FIG. 10B or 10D, when a user makes a drag 1011 or 1021 from a first movable point 1001-1 or a second movable point 1001-5 and then releases the touch at a first fixed point 1003-5, the electronic device may store a coordinate of the first fixed point 1003-5. At this time, the electronic device may display a folded pattern type as illustrated in FIG. 10C or 10E. That is, the pattern may be folded according to the selected first movable point 1001-1 or 1001-5 and a direction in which the selected first movable point 1001-1 or 1001-5 was moved by the drag 1011 or 1021. In addition, the electronic device may designate (e.g., generate and/or display) new movable points based on the resulting folded pattern type illustrated in FIG. 10C or 10E. For example, referring to FIG. 10C, the pattern has been folded along an axis defined by points 1001-19, 1003-1 and 1001-3. Accordingly, a new movable point is disposed at point 1003-1, which was previously a fixed point, referring to FIG. 10B. The new movable point 1003-1 is disposed along the axis of the fold.

Thereafter, in step 305, the electronic device may determine unlocking based on a coordinate corresponding to each of the drag inputs. For example, when coordinates to which the points have moved are the same as preset coordinates based on the pattern screen of the current state illustrated in FIG. 10C, 10E, or 10F, the electronic device may unlock the lock screen. In another example, when the coordinates to which the points have moved are not the same as the preset coordinates, the input pattern is determined to not be the same as the preset pattern. Thus, the electronic device may display information (e.g., a message display) indicating that a new pattern should be input (e.g., because of the unmatched pattern) to unlock the screen.

Figure 4:
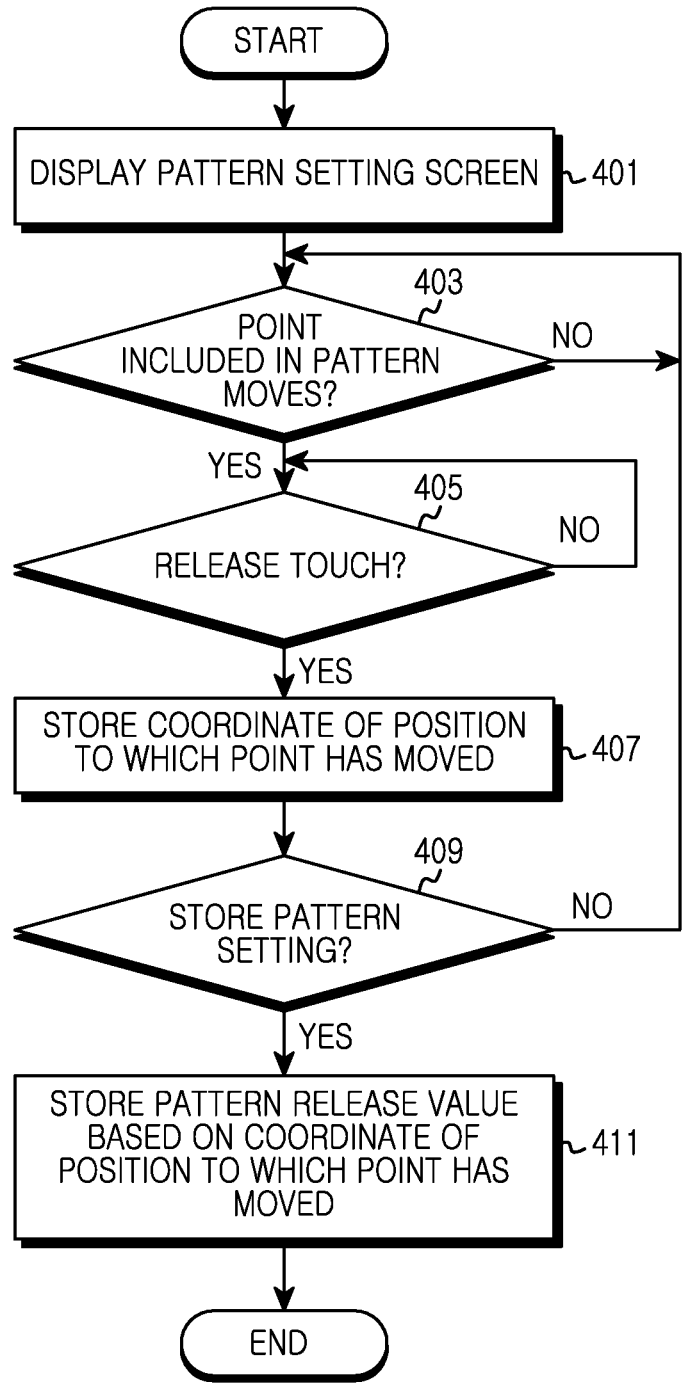
FIG. 4 illustrates a process for setting a pattern for unlocking based on coordinates of positions to which points have moved according to a plurality of drag inputs in an electronic device according to various embodiments of the present disclosure.

FIG. 4 illustrates a process for setting a pattern for unlocking based on coordinates of positions to which points have moved according to a plurality of drag inputs in the electronic device according to various embodiments.

Referring to FIG. 4, in step 401, the electronic device may display a pattern setting screen. For example, as illustrated in FIG. 10A, the electronic device may display a pattern setting screen including a plurality of movable points 1001-1 to 1001-20 (e.g., a grid of points). The pattern of movable points and non-movable or "fixed" points displayed on the display may be a pattern that is pre-stored in the electronic device, or a pattern defined by the user.

After displaying the pattern setting screen, the electronic device may identify whether a point included in the pattern moves in step 403. For example, the electronic device may identify whether one or more of the plurality of movable points 1001-1 to 1001-20 illustrated in FIG. 10A are moved by a user's control. The one or more of the plurality of movable points 1001-1 to 1001-20 may move to the plurality of movable points 1001-1 to 1001-20 or a plurality of fixed points 1003-1 to 1003-15. When the point included in the pattern does not move, the electronic device may maintain the display of the pattern setting screen to continuously identify whether the point included in the pattern moves.

Meanwhile, when the point included in the pattern moves, the electronic device may identify whether the touch is released in step 405. For example, as illustrated in FIG. 10B or 10D, when a user makes a drag 1011 or 1021 from a first movable point 1001-1 or a second movable point 1001-5, the electronic device may identify whether the touch is released after the drag 1011 or 1021.

When the touch is released, the electronic device may store a coordinate of the position to which the point has moved in step 407. For example, as illustrated in FIG. 10B or 10D, when a user makes the drag 1011 or 1021 from the first movable point 1001-1 or the second movable point 1001-5 and then releases the touch at a first fixed point 1003-5, the electronic device may store a coordinate of the first fixed point 1003-5. At this time, the electronic device may display a folded pattern type as illustrated in FIG. 10C or 10E. In addition, the electronic device may newly designate movable points based on the folded pattern type illustrated in FIG. 10C or 10E.

Thereafter, in step 409, the electronic device may identify whether a pattern setting storage event is generated. When the pattern setting storage event is not generated, the electronic device may maintain the display of the pattern setting screen and continuously identify whether the point included in the pattern moves.

Meanwhile, when the pattern setting storage event is generated, the electronic device may store a pattern release value based on the coordinate to which the point has moved in step 411. For example, when the pattern setting storage event is generated on the pattern setting screen illustrated in FIG. 10C, 10E, or 10F, the electronic device may store a coordinate of the position to which the point has moved as the pattern release value based on the pattern setting screen of the current state.

When the pattern setting storage event is generated, the electronic device may display an initial pattern setting screen to receive the same pattern setting again as illustrated in FIG. 10A in order to increase the accuracy of the pattern setting. When the same pattern setting is input by a user's control, the electronic device may store the pattern release value. When a different pattern setting is input, the electronic device may display information indicating that a new setting should be made since the pattern setting is different.

Figure 5:
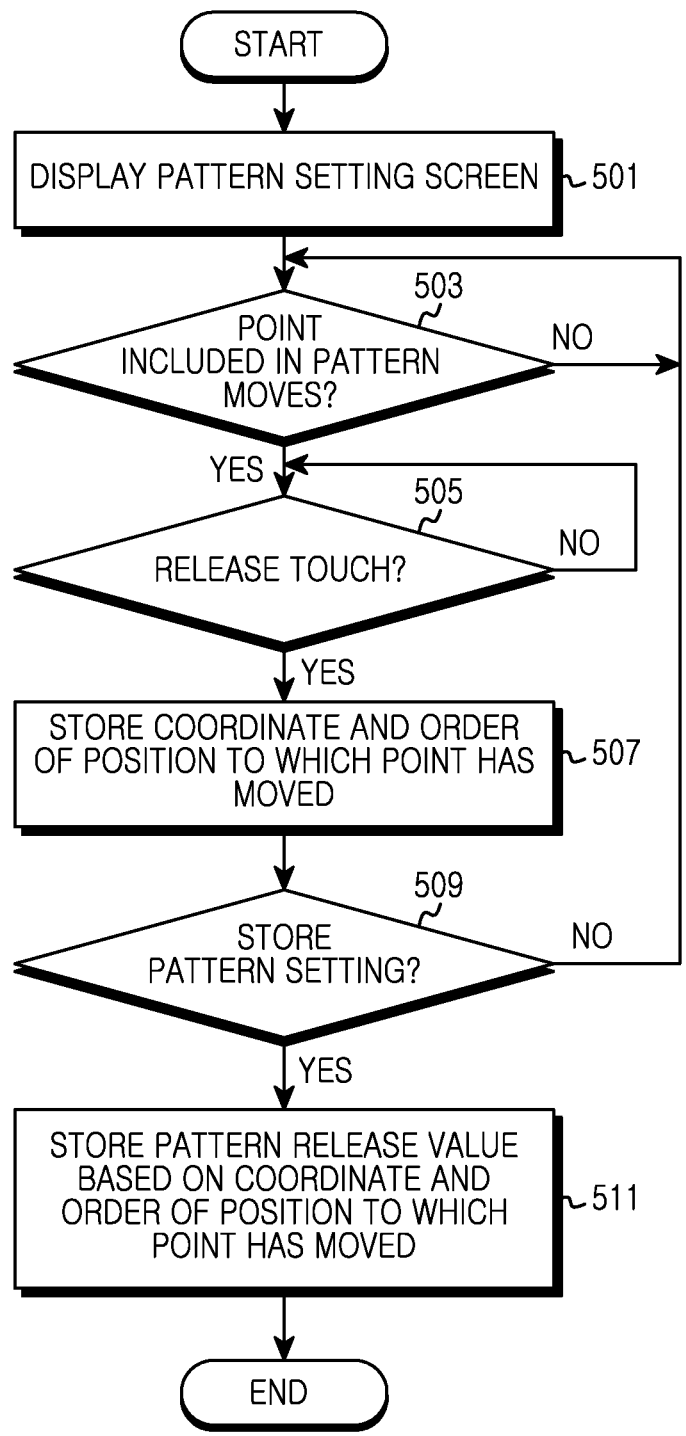
FIG. 5 illustrates a process for setting a pattern for unlocking based on coordinates and orders of positions to which points have moved according to a plurality of drag inputs in an electronic device according to various embodiments of the present disclosure.

FIG. 5 illustrates a process for setting a pattern for unlocking based on coordinates and orders of positions to which points have moved according to a plurality of drag inputs in the electronic device according to various embodiments.

Referring to FIG. 5, in step 501, the electronic device may display a pattern setting screen. For example, as illustrated in FIG. 10A, the electronic device may display a pattern setting screen including a plurality of movable points 1001-1 to 1001-20. The pattern displayed on the display may be a pattern pre-stored in the electronic device or a pattern defined by the user.

After displaying the pattern setting screen, the electronic device may detect whether a point included in the pattern moves in step 503. For example, the electronic device may detect whether one or more of the plurality of movable points 1001-1 to 1001-20 as illustrated in FIG. 10A are moved by a user's control. The one or more of the plurality of movable points 1001-1 to 1001-20 may move to the plurality of movable points 1001-1 to 1001-20 or a plurality of fixed points 1003-1 to 1003-15. When the point included in the pattern does not move, the electronic device may maintain the display of the pattern setting screen and continuously detect whether the point included in the pattern moves.

Meanwhile, when the point included in the pattern moves, the electronic device may detect whether the touch is released in step 505. For example, as illustrated in FIG. 10B or 10D, when a user makes a drag 1011 or 1021 from a first movable point 1001-1 or a second movable point 1001-5, the electronic device may detect whether the touch is released after the drag 1011 or 1021.

When the touch is released, the electronic device may store coordinates and orders of positions to which the points have moved in step 507. For example, as illustrated in FIG. 10B, when a user makes the drag 1011 from the first movable point 1001-1 and then releases the touch at a first fixed point 1003-5, the electronic device may store a coordinate of the first fixed point 1003-5 and an order corresponding to a first movement. In another example, as illustrated in FIG. 10D, when a user makes the drag 1021 from the second movable point 1001-5 and then releases the touch at the first fixed point 1003-5, the electronic device may store a coordinate of the second fixed point 1003-5 and an order corresponding to a second movement. At this time, the electronic device may display a folded pattern type as illustrated in FIG. 10C or 10E. In addition, the electronic device may newly designate movable points based on the folded pattern type illustrated in FIG. 10C or 10E.

Thereafter, in step 509, the electronic device may detect whether a pattern setting storage event is generated. When the pattern setting storage event is not generated, the electronic device may maintain the display of the pattern setting screen to continuously detect whether the point included in the pattern moves.

Meanwhile, when the pattern setting storage event is generated, the electronic device may store a pattern release value based on the coordinate and order of the position to which the point has moved in step 511. For example, when the pattern setting storage event is generated on the pattern setting screen illustrated in FIG. 10C, 10E, or 10F, the electronic device may store a coordinate or order of the position to which the point has moved as the pattern release value based on the pattern setting screen of the current state.

When the pattern setting storage event is generated, the electronic device may display an initial pattern setting screen to receive the same pattern setting again as illustrated in FIG. 10A in order to increase the accuracy of the pattern setting. When the same pattern setting is input by a user's control, the electronic device may store the pattern release value. When a different pattern setting is input, the electronic device may display information indicating that a new setting should be made since the pattern setting is different.

Figure 6:
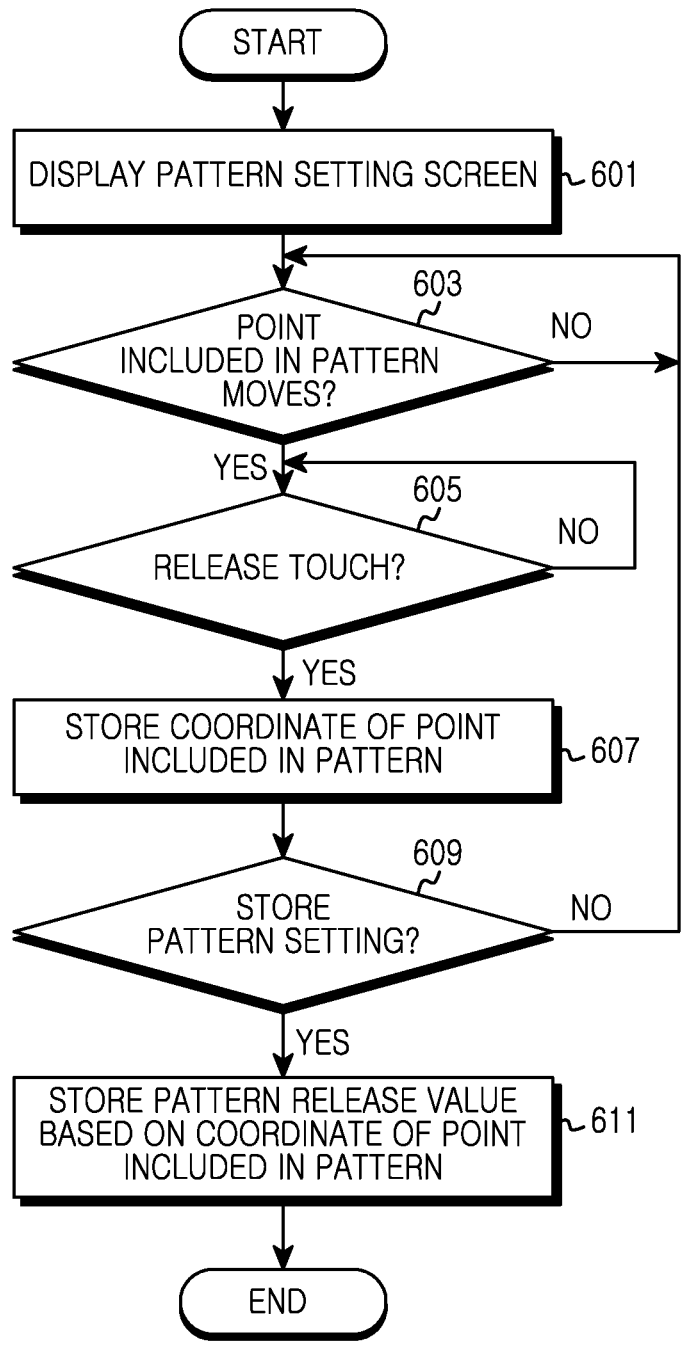
FIG. 6 illustrates a process for setting a pattern for unlocking based on coordinates of points included in a pattern according to a plurality of drag inputs in an electronic device according to various embodiments of the present disclosure.

FIG. 6 illustrates a process for setting a pattern for unlocking based on coordinates of points included in a pattern according to a plurality of drag inputs in the electronic device according to various embodiments.

Referring to FIG. 6, in step 601, the electronic device may display a pattern setting screen. For example, as illustrated in FIG. 10A, the electronic device may display a pattern setting screen including a plurality of movable points 1001-1 to 1001-20. The pattern displayed on the display may be a pattern pre-stored in the electronic device or a pattern defined by the user.

After displaying the pattern setting screen, the electronic device may identify whether a point included in the pattern moves in step 603. For example, the electronic device may identify whether one or more of the plurality of movable points 1001-1 to 1001-20 as illustrated in FIG. 10A are moved by a user's control. The one or more of the plurality of movable points 1001-1 to 1001-20 may move to the plurality of movable points 1001-1 to 1001-20 or a plurality of fixed points 1003-1 to 1003-15. When the point included in the pattern does not move, the electronic device may maintain the display of the pattern setting screen to continuously identify whether the point included in the pattern moves.

Meanwhile, when the point included in the pattern moves, the electronic device may identify whether the touch is released in step 605. For example, as illustrated in FIG. 10B or 10D, when a user makes a drag 1011 or 1021 from a first movable point 1001-1 or a second movable point 1001-5, the electronic device may identify whether the touch is released after the drag 1011 or 1021.

When the touch is released, the electronic device may store a coordinate of the point included in the pattern in step 607. For example, as illustrated in FIG. 10B, when a user makes a drag 1011 from a first movable point 1001-1 and then releases the touch at a first fixed point 1003-5, the electronic device may store coordinates of the points remained in the pattern setting screen as illustrated in FIG. 10C. According to various embodiments of the present invention, the electronic device may store coordinates of movable points 1001-3 to 1001-19 remained in the pattern setting screen. According to various embodiments of the present invention, the electronic device may store coordinates of fixed points 1003-2 to 1003-15 remained in the pattern setting screen. According to various embodiments of the present invention, the electronic device may store a combination of coordinates of movable points and fixed points remained in the pattern setting screen.

In another example, as illustrated in FIG. 10D, when a user makes the drag 1021 from the second movable point 1005-1 and then releases the touch at the first fixed point 1003-5, the electronic device may store coordinates included in the pattern as illustrated in FIG. 10E. More specifically, the electronic device may store coordinates of points based on at least one of the movable points 1001-3, 1001-7 to 1001-19, 1003-1, and 1003-3, the fixed points 1003-2, 1003-4 to 1003-15, and a combination of the movable points and the fixed points in the pattern illustrated in FIG. 1 OE.

At this time, the electronic device may display a folded pattern type as illustrated in FIG. 10C or 10E. In addition, the electronic device may newly designate movable points based on the folded pattern type illustrated in FIG. 10C or 10E.

Thereafter, in step 609, the electronic device may identify whether a pattern setting storage event is generated. When the pattern setting storage event is not generated, the electronic device may maintain the display of the pattern setting screen to continuously identify whether the point included in the pattern moves.

Meanwhile, when the pattern setting storage event is generated, the electronic device may store a pattern release value based on the coordinates of the points included in the pattern in step 611. For example, when the pattern setting storage event is generated on the pattern setting screen illustrated in FIG. 10C, 10E, or 10F, the electronic device may store coordinates of the points included in the pattern as the pattern release value based on the pattern setting screen of the current state.

When the pattern setting storage event is generated, the electronic device may display an initial pattern setting screen to receive the same pattern setting again as illustrated in FIG. 10A in order to increase the accuracy of the pattern setting. When the same pattern setting is input by a user's control, the electronic device may store the pattern release value. When a different pattern setting is input, the electronic device may display information indicating that a new setting should be made since the pattern setting is different.

In the above described embodiment, the electronic device may set the pattern release value based on coordinates of positions to which points included in the pattern have moved, coordinates or orders of positions to which points have moved, or coordinates of points included in the pattern.

Figure 7:
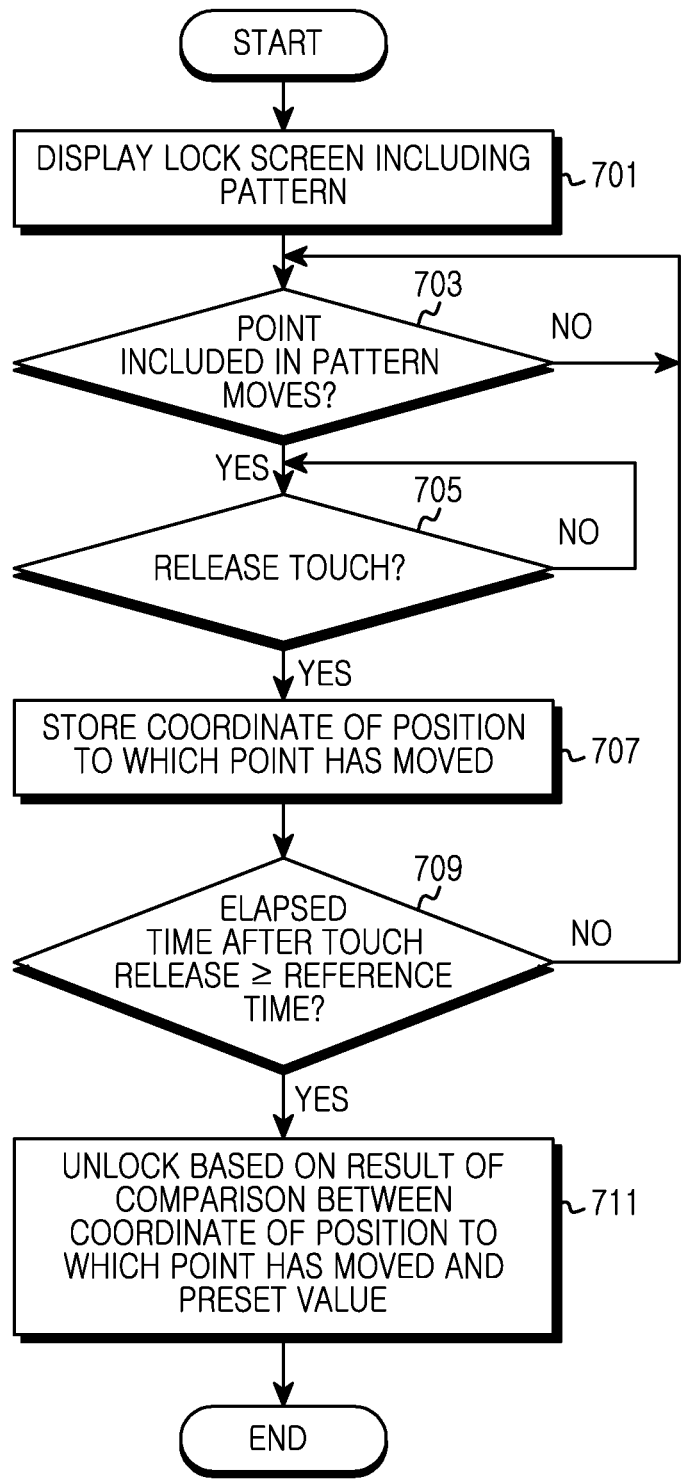
FIG. 7 illustrates a process for determining unlocking based on coordinates of positions to which points have moved according to a plurality of drag inputs in an electronic device according to various embodiments of the present disclosure.

In another embodiment, the electronic device may control unlocking based on a result of a comparison between coordinates of positions to which points included in the pattern and preset values as illustrated in FIG. 7.

FIG. 7 illustrates a process for determining unlocking based on coordinates of positions to which points have moved according to a plurality of drag inputs in the electronic device according to various embodiments.

Referring to FIG. 7, in step 701, the electronic device may display a lock screen including a pattern. For example, as illustrated in FIG. 10A, the electronic device may display a lock screen including a pattern having a plurality of movable points 1001-1 to 1001-20. The pattern displayed on the display may be a pattern pre-stored in the electronic device or a pattern defined by the user.

After displaying the lock screen, the electronic device may identify whether a point included in the pattern is moved in step 703. For example, the electronic device may identify whether one or more of the plurality of movable points 1001-1 to 1001-20 as illustrated in FIG. 10A are moved by a user's control (e.g., a touch input). The one or more of the plurality of movable points 1001-1 to 1001-20 may be moved to another of the plurality of movable points 1001-1 to 1001-20, or to one of a plurality of fixed points 1003-1 to 1003-15. When the point included in the pattern is not moved, the electronic device may maintain the display of the lock screen, and monitor as to whether the point included in the pattern is moved.

Meanwhile, when the point included in the pattern is moved, the electronic device may identify whether the touch input is released in step 705. For example, as illustrated in FIG. 10B or 10D, when a user executes a drag input 1011 or 1021 from a first movable point 1001-1 or a second movable point 1001-5, the electronic device may identify whether the touch input is released indicating a termination of the drag input 1011 or 1021.

When the touch input is released, the electronic device may detect (and/or store) a coordinate of the position to which the point has moved in step 707. For example, as illustrated in FIG. 10B or 10D, when a user executes the drag input 1011 or 1021 from the first movable point 1001-1 or the second movable point 1001-5 and then releases the touch at a first fixed point 1003-5, the electronic device may detect and/or store a coordinate of the first fixed point 1003-5. At this time, the electronic device may display a folded-pattern type as illustrated in FIG. 10C or 10E. In addition, the electronic device may newly designate movable points based on the folded pattern type illustrated in FIG. 10C or 10E.

Thereafter, in step 709, the electronic device may compare a time elapsed from the release of the touch with a pre-specified reference (e.g., threshold) time. When the time elapsed from the touch release is smaller than the reference time, the electronic device may proceed to step 703 and may further detect whether another point is moved to release the lock pattern.

Meanwhile, when the time elapsed from the touch release is larger than or equal to the reference time, the electronic device may be successfully unlocked, based on a result of the comparison between at least a coordinate of a position to which the at least one point has moved with a preset value in step 711. For example, when there is a series of detected moved points, the comparison may determine that coordinates to which the points have been moved are the same as preset coordinates, based on the current pattern screen illustrated in FIG. 10C, 10E, or 10F, and thus, the electronic device may release the lock screen. In another example, when the plurality of coordinates to which the points have moved do not match the preset coordinates, it may be determined that the input pattern is not the same as the preset pattern, so the lock screen may not be released. The electronic device may instead display a request to input a new pattern.

Figure 8:
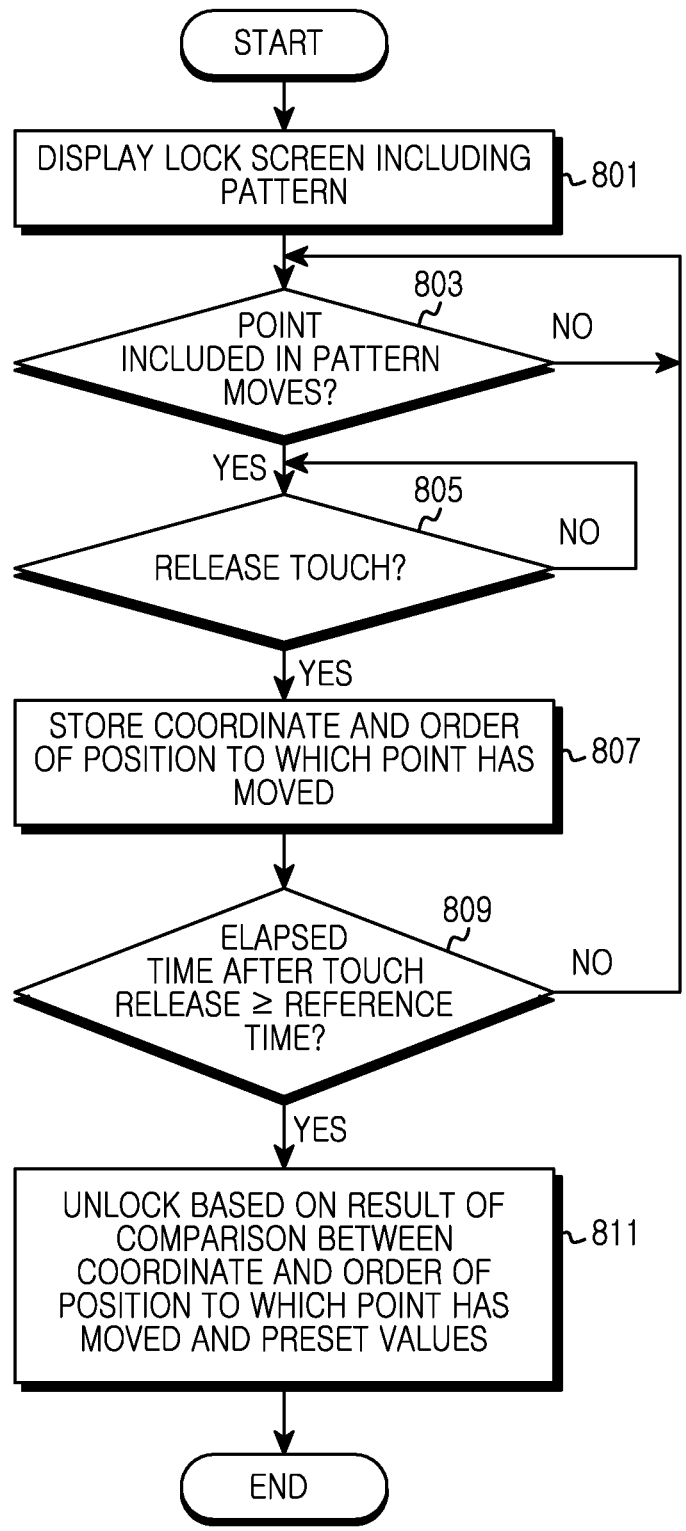
FIG. 8 illustrates a process for determining unlocking based on coordinates and orders of positions to which points have moved according to a plurality of drag inputs in an electronic device according to various embodiments of the present disclosure.

FIG. 8 illustrates a process for determining unlocking based on coordinates and an orders of positions to which points have been moved according to a plurality of drag inputs in the electronic device according to various embodiments.

Referring to FIG. 8, in step 801, the electronic device may display a lock screen including a pattern. For example, as illustrated in FIG. 10A, the electronic device may display a lock screen including a pattern including a plurality of movable points 1001-1 to 1001-20. The pattern displayed on the display may be a pattern pre-stored in the electronic device or a pattern defined by the user.

After displaying the lock screen, the electronic device may identify whether a point included in the pattern moves in step 803. For example, the electronic device may identify whether one or more of the plurality of movable points 1001-1 to 1001-20 as illustrated in FIG. 10A are moved by a user's control. The one or more of the plurality of movable points 1001-1 to 1001-20 may move to the plurality of movable points 1001-1 to 1001-20 or a plurality of fixed points 1003-1 to 1003-15. When the point included in the pattern does not move, the electronic device may maintain the display of the lock screen and continuously identify whether the point included in the pattern moves.

Meanwhile, when the point included in the pattern moves, the electronic device may identify whether the touch is released in step 805. For example, as illustrated in FIG. 10B or 10D, when a user makes a drag 1011 or 1021 from a first movable point 1001-1 or a second movable point 1001-5, the electronic device may identify whether the touch is released after the drag 1011 or 1021.

When the touch is released, the electronic device may store both the coordinates to which each point was moved, and the order of positions to which the points have moved in step 807. For example, as illustrated in FIG. 10B, when a user makes the drag 1011 from the first movable point 1001-1 and then releases the touch at a first fixed point 1003-5, the electronic device may store a coordinate of the first fixed point 1003-5 and an order thereof corresponding to a first movement. Similarly, as illustrated in FIG. 10D, when a user makes the drag 1021 from the second movable point 1001-5 and then releases the touch at the first fixed point 1003-5, the electronic device may store a coordinate of the first fixed point 1003-5 and an order corresponding to a second movement. At this time, the electronic device may display a folded pattern type as illustrated in FIG. 10C or 10E. In addition, the electronic device may newly designate movable points based on the folded pattern type illustrated in FIG. 10C or 10E.

Thereafter, in step 809, the electronic device may compare a time elapsed from the release of the touch with a reference time. When the time elapsed from the touch release is smaller than the reference time, the electronic device may proceed to step 803 and may identify whether a point additionally moves to release the pattern.

Meanwhile, when the time elapsed from the touch release is larger than or equal to the reference time, the electronic device may be unlocked when a comparison between a coordinate and order of a position to which the point has moved with preset values in step 811. For example, when both the coordinates to which the respective points were moved, and the order in which each point was moved to the respective position matches the preset coordinates and preset movement orders, based on the pattern screen of the current state illustrated in FIG. 10C, 10E, or 10F, the electronic device may make a control to release the lock screen. In another example, when the coordinates and orders of positions to which the points have moved do not match the preset coordinates and respective orders, it is determined that the input pattern is not the same as the preset pattern. The lock may not be released, and the electronic device may instead display information indicating (or requesting) that a new pattern should be input.

Figure 9:
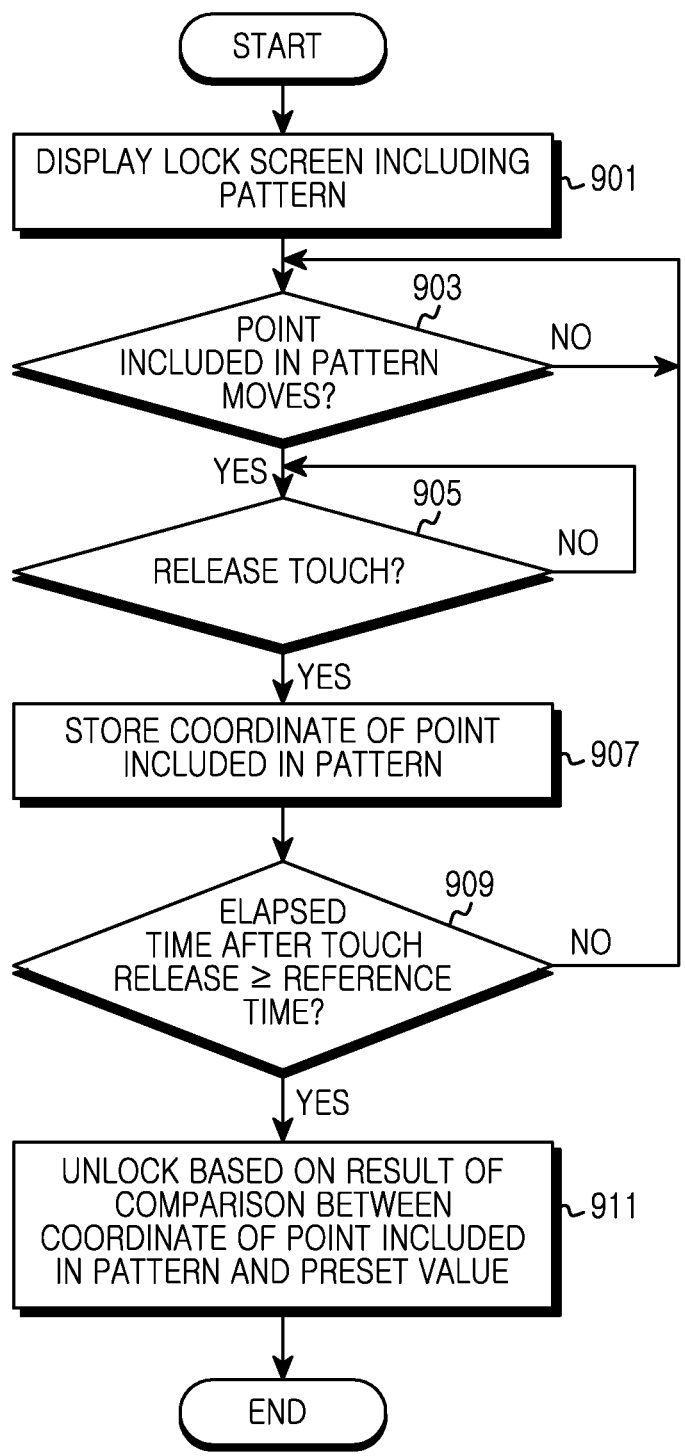
FIG. 9 illustrates a process for determining unlocking based on coordinates of points included in a pattern according to a plurality of drag inputs in an electronic device according to various embodiments of the present disclosure.

FIG. 9 illustrates a process for determining unlocking based on coordinates of points included in a pattern according to a plurality of drag inputs in the electronic device according to various embodiments.

Referring to FIG. 9, in step 901, the electronic device may display a lock screen including a pattern. For example, as illustrated in FIG. 10A, the electronic device may display a lock screen including a pattern having a plurality of movable points 1001-1 to 1001-20. The pattern displayed on the display may be a pattern pre-stored in the electronic device or a pattern defined by the user.

After displaying the lock screen, the electronic device may identify whether a point included in the pattern moves in step 903. For example, the electronic device may identify whether one or more of the plurality of movable points 1001-1 to 1001-20 as illustrated in FIG. 10A are moved by a user's control. The one or more of the plurality of movable points 1001-1 to 1001-20 may move to the plurality of movable points 1001-1 to 1001-20 or a plurality of fixed points 1003-1 to 1003-15. When the point included in the pattern does not move, the electronic device may maintain the display of the lock screen and continuously identify whether the point included in the pattern moves.

Meanwhile, when the point included in the pattern moves, the electronic device may identify whether the touch is released in step 905. For example, as illustrated in FIG. 10B or 10D, when a user makes a drag 1011 or 1021 from a first movable point 1001-1 or a second movable point 1001-5, the electronic device may identify whether the touch is released after the drag 1011 or 1021.

When the touch is released, the electronic device may store a coordinate of the point included in the pattern in step 907. For example, as illustrated in FIG. 10B or 10D, when a user makes the drag 1011 or 1021 from the first movable point 1001-1 or the second movable point 1001-5 and then releases the touch at the first fixed point 1003-5, the electronic device may store coordinates of points included in the pattern setting screen of the current state, such as a coordinate of the movable point that was moved, a coordinate of a fixed or movable point to which the movable point was moved, or both coordinates of the movable point that was moved, and the fixed or movable point to which the movable point was moved At this time, the electronic device may display a folded pattern as illustrated in FIG. 10C or 10E. In addition, the electronic device may designate and display new movable points based on the folded pattern type illustrated in FIG. 10C or 10E.

Thereafter, in step 909, the electronic device may compare a time elapsed from the release of the touch with a reference time. When the time elapsed from the touch release is smaller than the reference time, the electronic device may proceed to step 903 and may identify whether a point additionally moves to release the pattern.

Figure 10F:
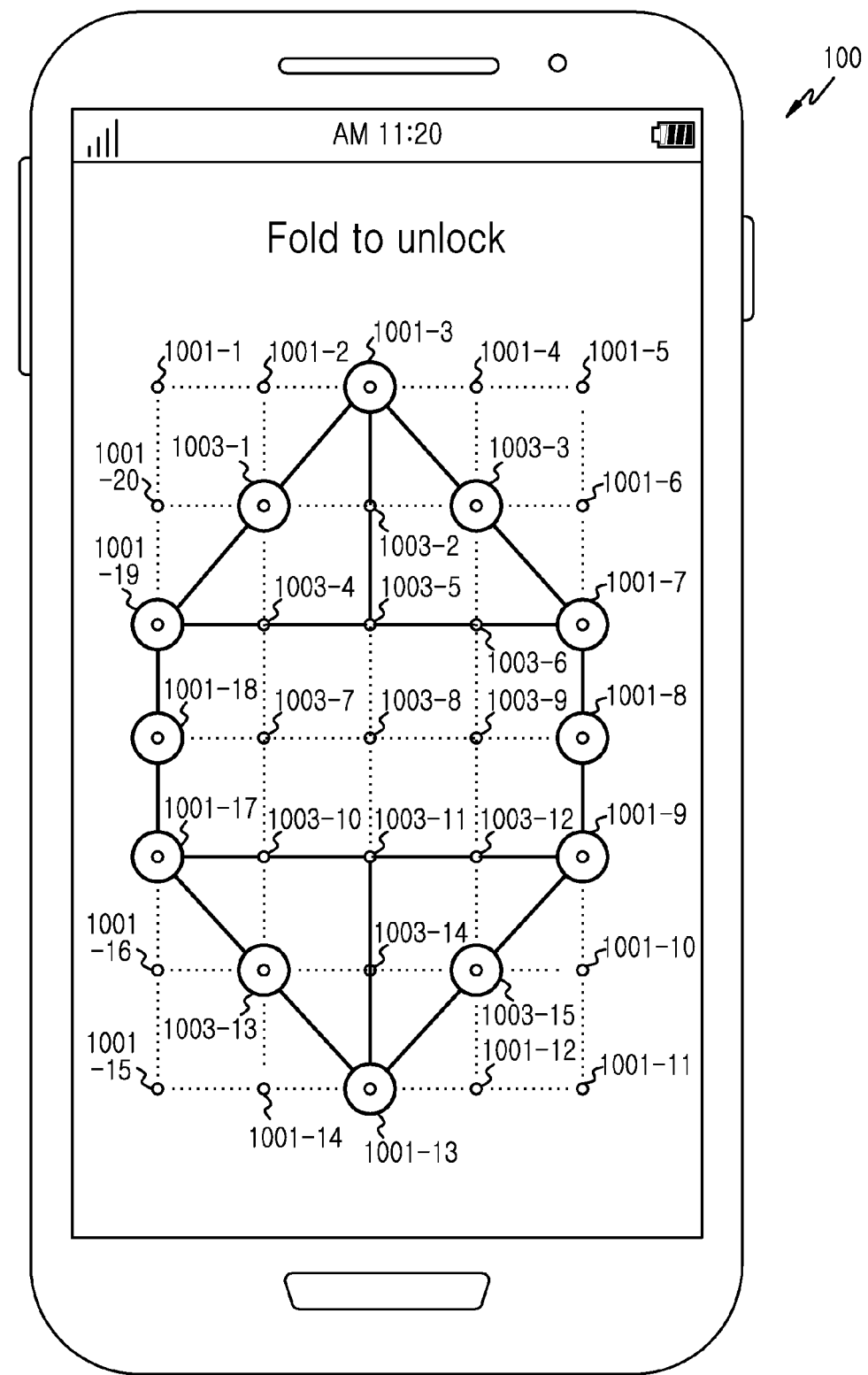

Meanwhile, when a time elapsed from the touch release is larger than or equal to a reference time, the electronic device may be unlocked based on a result of the comparison between the coordinate of the point included in the pattern with a preset value in step 911. For example, when the coordinate of the point included in the pattern of the current state illustrated in FIG. 10C, 10E, or 10F is the same as a preset coordinate, the electronic device may make a control to release the lock screen. In another example, when the coordinate of the point included in the pattern is not the same as the preset coordinate, it means that the input pattern is not the same as the preset pattern, so that the electronic device may display information indicating that a new pattern should be input.

Although the form in which parts of the pattern which are folded do not overlap each other when the electronic device sets or releases the pattern has been described in the above embodiment, the electronic device may include the form in which folded parts of the pattern overlap each other as illustrated in FIGS. 11A to 11G.

Figure 11A:
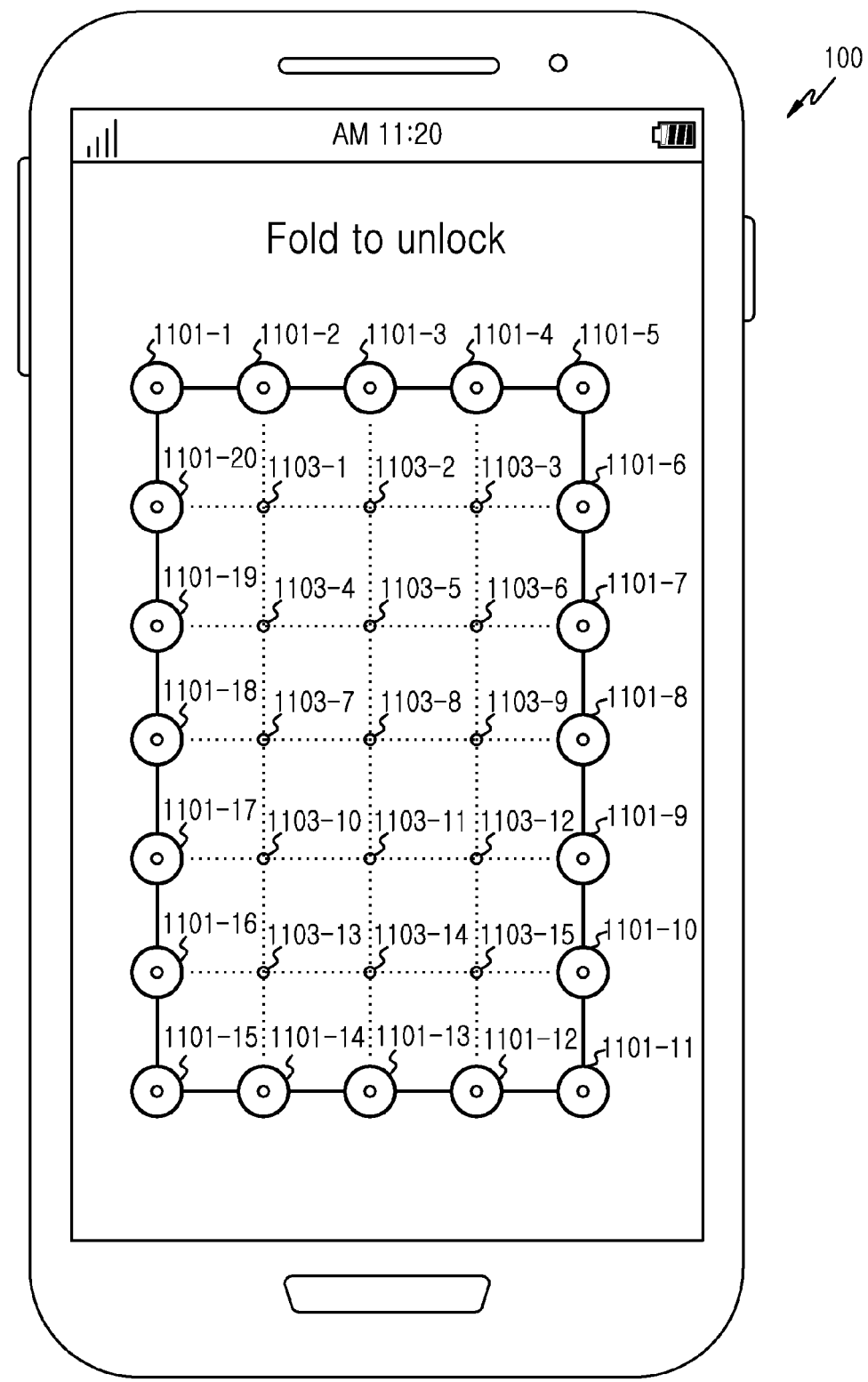
FIG. 11A, FIG. 11B, FIG. 11C, FIG. 11D, FIG. 11E, FIG. 11F and FIG. 11G illustrate screen configurations for setting or releasing a pattern in an electronic device according to various embodiments of the present disclosure.

For example, as illustrated in FIG. 11A, the electronic device may display a pattern setting screen including a plurality of movable points 1101-1 to 1101-20. The pattern displayed on the display may be a pattern pre-stored in the electronic device or a pattern defined by the user.

After displaying the pattern setting screen, the electronic device may identify whether one or more of the plurality of movable points 1101-1 to 1101-20 are moved by a user's control. The one or more of the plurality of movable points 1101-1 to 1101-20 may move to the plurality of movable points 1101-1 to 1101-20 or a plurality of fixed points 1103-1 to 1103-15.

Figure 11B:
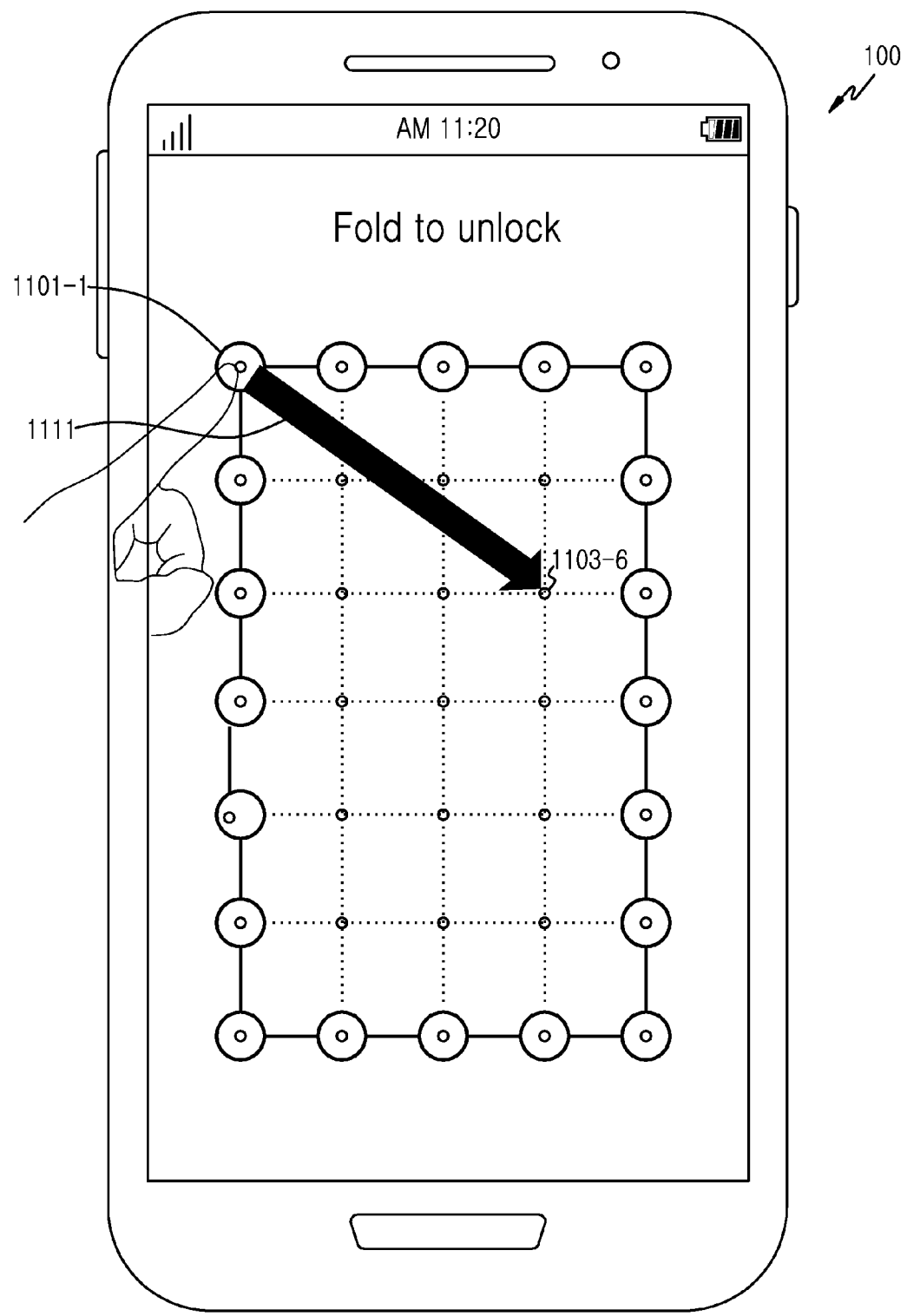
Figure 11C:
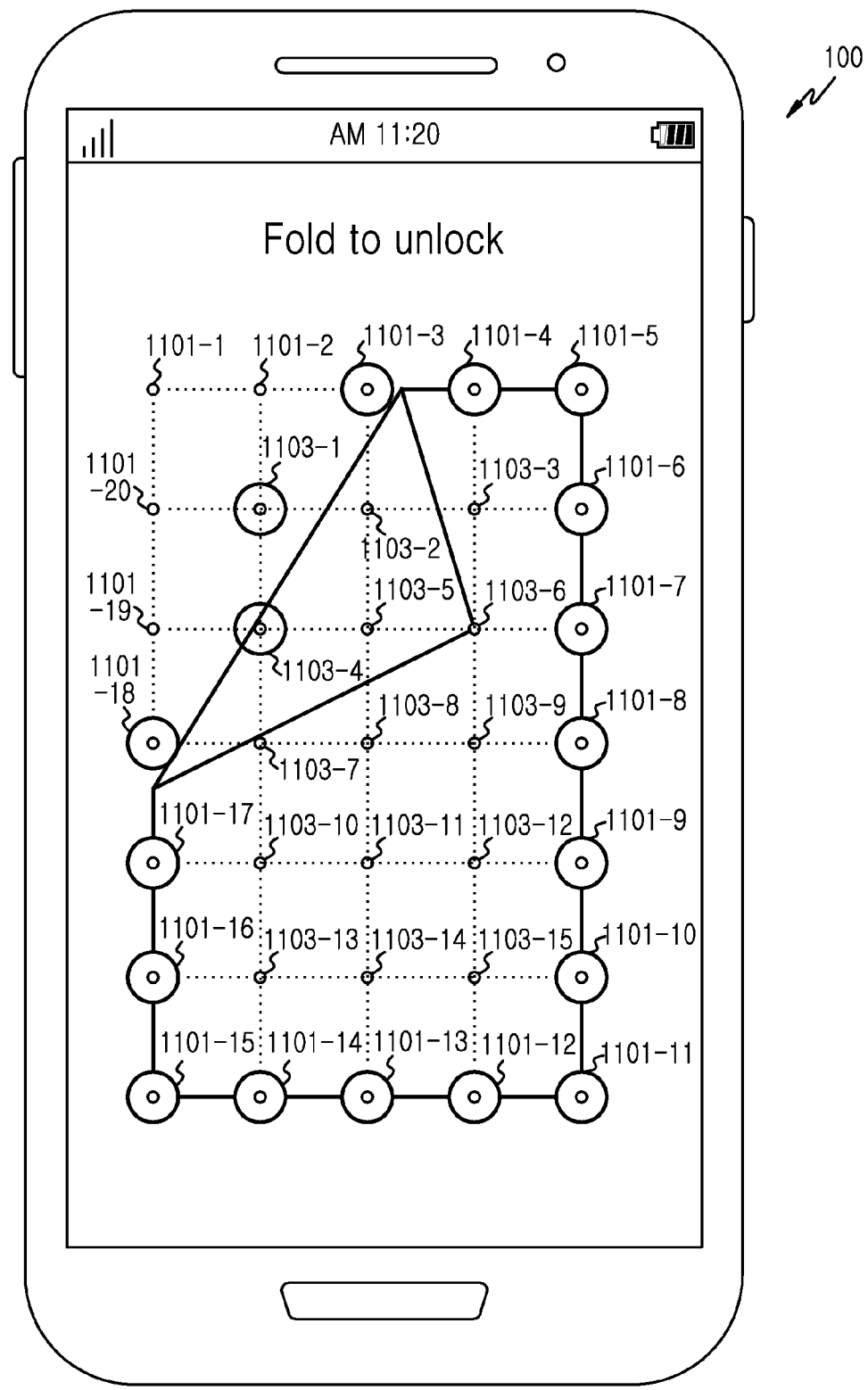
Figure 11D:
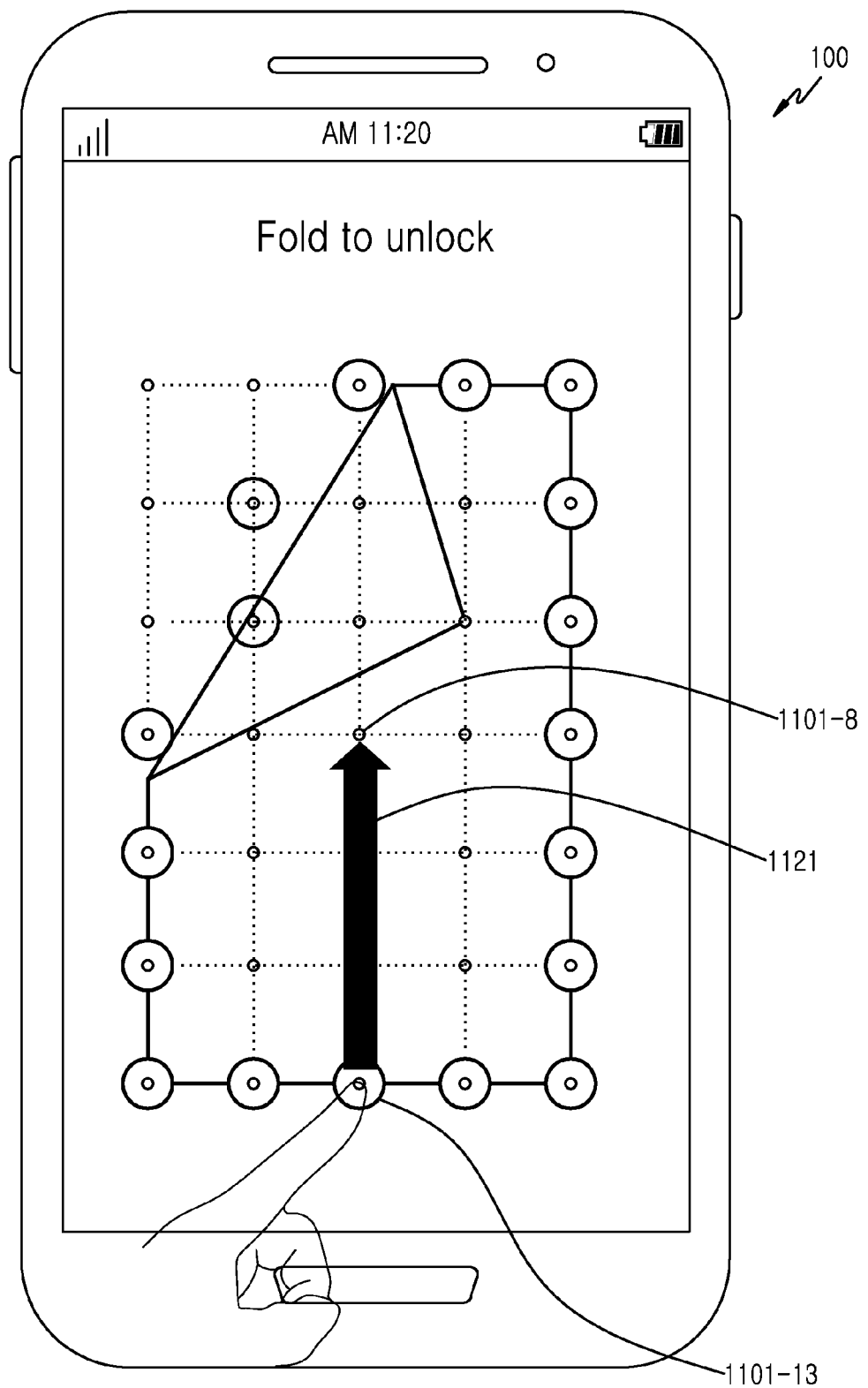
Figure 11E:
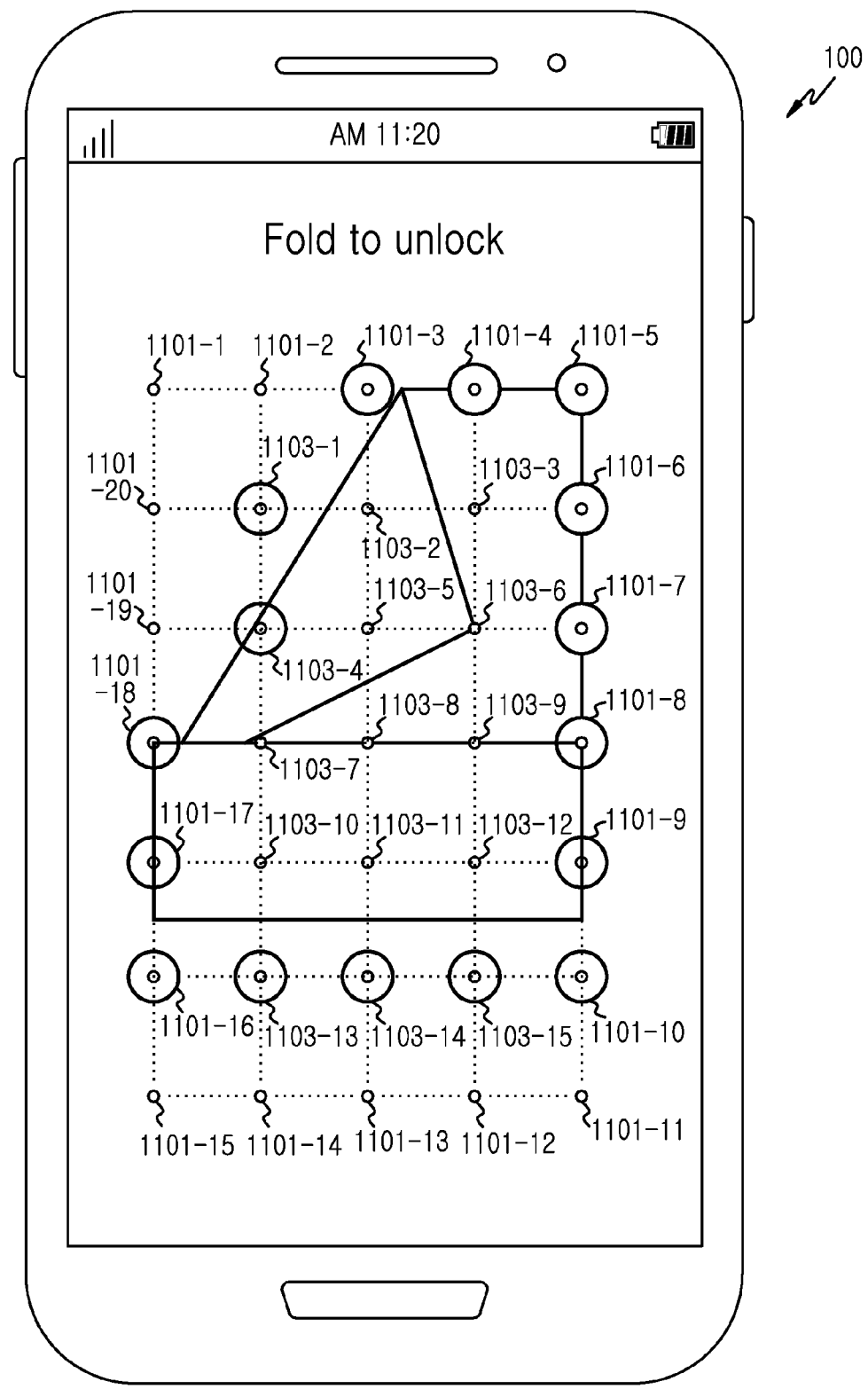
Figure 11F:
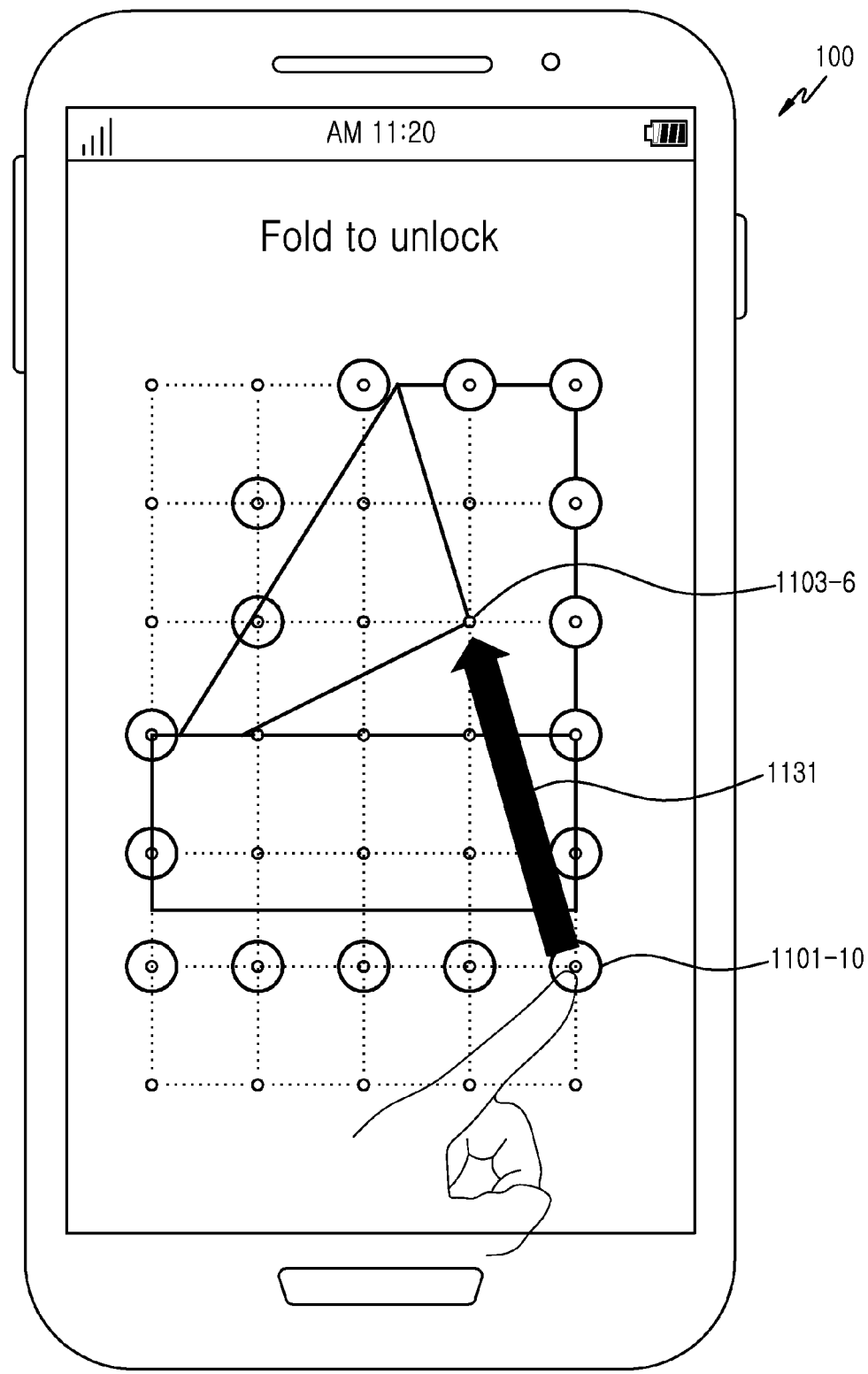

When a user makes a drag 1111, 1121, or 1131 from a first movable point 1101-1, a second movable point 1101-13, or a third movable point 1101-10 as illustrated in FIG. 11B, 11D, or 11F, the electronic device may identify release of the touch after the drag 1111, 1121, or 1131.

Figure 11G:
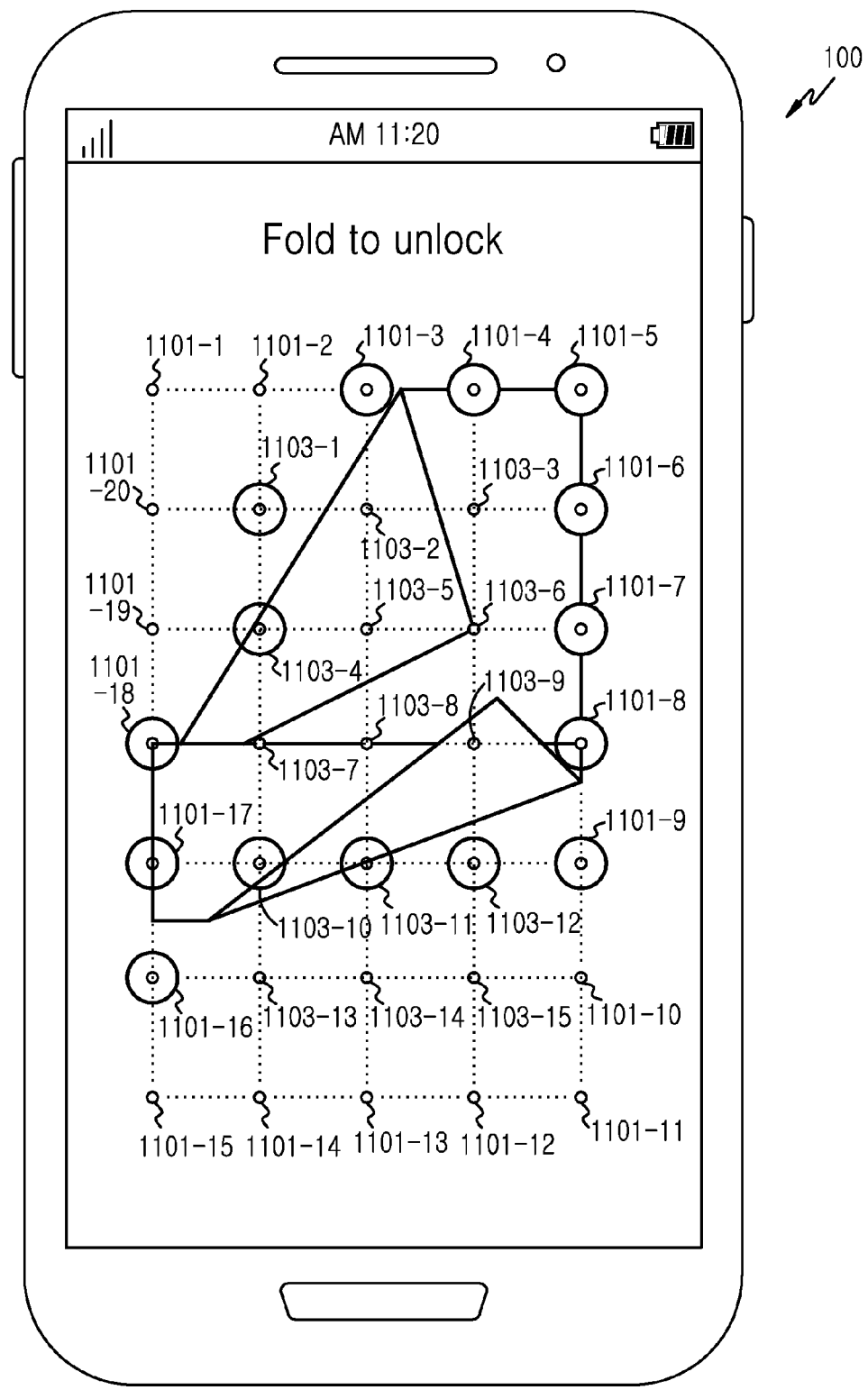

When the touch is released at a first fixed point 1103-6 or a second fixed point 1103-8 after the drag 1111, 1121, or 1131, the electronic device may store a coordinate of the first fixed point 1103-6 or the second fixed point 1103-8. At this time, the electronic device may display a folded pattern type as illustrated in FIG. 11C, 11E, or 11G. In addition, the electronic device may newly designate movable points based on the folded pattern type illustrated in FIG. 11C, 11E, or 11G.

When a pattern setting storage event is generated on the pattern setting screen illustrated in FIG. 11C, 11E, or 11G, the electronic device may store a coordinate of the position to which the point has moved as a pattern release value based on the pattern setting screen of the current state. The electronic device may display an initial pattern setting screen to receive the same pattern setting again as illustrated in FIG. 11A in order to increase the accuracy of the pattern setting. When the same pattern setting is input by a user's control, the electronic device may store the pattern release value. When a different pattern setting is input, the electronic device may display information indicating that a new setting should be made since the pattern setting is different.

In the above described embodiment, the electronic device may include a form in which folded parts of the pattern overlap each in the pattern setting as illustrated in FIGS. 11A to 11G. In another embodiment, the electronic device may include the form in which the folded parts of the pattern overlap each other in the pattern release.

According to various embodiments, a method for a lockscreen in an electronic device, the method comprising displaying a lockscreen pattern including movable points repositionable in response to a drag input, and fixed points that are stationary; detecting drag inputs moving the movable points within the lockscreen pattern; and unlocking the electronic device if the detected drag inputs moving the movable points match a pre-specified unlock condition.

According to various embodiments, the drag inputs are executed responsive to a multi-touch input.

According to various embodiments, the pre-specified unlock condition includes a pre-specified order for the drag inputs moving the movable points within the lockscreen pattern, and the electronic device is unlocked if an order of the detected drag inputs matches the pre-specified order.

According to various embodiments, the pre-specified unlock condition further includes pre-specified coordinates to which each of the plurality of drag inputs is moved, and the electronic device is unlocked if each of the detected drag inputs are moved to each of the pre-specified coordinates, in the order matching the pre-specified order.

According to various embodiments, the method further comprising in response to detecting a drag input moving a particular movable point, displaying folding of the displayed lockscreen pattern, wherein the folding is based on an initial coordinate of the particular moveable point and a direction in which the particular movable point is moved by the drag input.

According to various embodiments, the method further comprising displaying at least one new movable point on the folded displayed lockscreen pattern.

According to various embodiments, the at least one new movable point is disposed along an axis of a fold of the folded displayed lockscreen pattern.

According to various embodiments, the at least one new movable point is displayed by converting at least one fixed point into the at least one new movable point.

According to various embodiments, the pre-specified unlock condition further comprises pre-specified source coordinates indicating particular movable points, and the electronic device is unlocked if the particular movable points moved by the drag inputs correspond to the pre-specified source coordinates.

According to various embodiments, the pre-specified unlock condition further comprises pre-specified destination coordinates to which the particular movable points are to be moved, and the electronic device is unlocked if the drag inputs move the particular movable points from the pre-specified source coordinates to the pre-specified desintation coordinates.

As described above, by determining the unlocking of the electronic device based on a plurality of drags for the pattern, security of the electronic device may be enhanced.

Methods stated in claims and/or specifications according to various embodiments may be implemented by hardware, via the execution of software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The one or more programs may include instructions for allowing the electronic device to perform methods stated in claims and/or specifications according to various embodiments.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, the programs may be stored in a memory configured by a combination of some or all of the listed components. Further, a plurality of configuration memories may be included.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. The storage device may access the electronic device through an external port.

Further, a separate storage device on a communication network may access a portable electronic device.

Meanwhile, although the concrete embodiments of the present disclosure have been described in the detailed description of the present disclosure, various modifications can be made without departing from the scope of the present disclosure. Therefore, the scope of the present disclosure should not be limited to the aforementioned embodiments, but should be defined by the equivalents to the appended claims as well as the claims.

What is claimed is:

1. A method for a lockscreen in an electronic device, the method comprising:
   displaying a lockscreen pattern including a plurality of points including at least one movable points repositionable in response to a drag input, and at least one fixed point that is stationary, wherein each of the plurality of points is spaced from another adjacent point in the plurality of points by a predetermined distance on the lockscreen pattern;
   detecting drag inputs moving a movable point within the lockscreen pattern;
   in response to detecting drag inputs moving the movable point, displaying folding of the displayed lockscreen pattern based on the moving of the movable points;
   in response to displaying folding of the displayed lockscreen pattern, changing an arrangement of at least one point included in the folded displayed lockscreen pattern based on a folded area;
   determine whether the folded displayed lockscreen pattern that changed the arrangement of the at least one point is matched with a pre-specified unlock condition; and
   unlocking the electronic device when the folded displayed lockscreen pattern that changed the arrangement of the at least one point is matched with the pre-specified unlock condition.

2. The method of claim 1, wherein the drag inputs are executed responsive to a multi-touch input.

3. The method of claim 1, wherein the pre-specified unlock condition includes pre-specified coordinates of the fixed points in the folded displayed lockscreen pattern that changed the arrangement of the at least one point.

4. The method of claim 3, wherein the pre-specified unlock condition further includes pre-specified coordinates of the movable points in the folded displayed lockscreen pattern that changed the arrangement of the at least one point.

5. The method of claim 1, wherein the folded area is determined based on an initial coordinate of a particular moveable point and a direction in which the particular movable point is moved by the drag input.

6. The method of claim 1, wherein changing the arrangement of the at least one point included in the folded displayed lockscreen pattern comprising displaying at least one new movable point on the folded displayed lockscreen pattern.

7. The method of claim 6, wherein the at least one new movable point is disposed along an axis of a fold of the folded displayed lockscreen pattern.

8. The method of claim 6, wherein the at least one new movable point is displayed by converting at least one fixed point into the at least one new movable point.

9. The method of claim 5, wherein the pre-specified unlock condition further comprises pre-specified coordinates of the fixed points with the movable points in the folded displayed lockscreen pattern that changed the arrangement of the at least one point.

10. An electronic device comprising:
    a display;
    a memory; and
    one or more processors configured to execute operations of:

controlling the display to display a lockscreen pattern including a plurality of points including at least one movable points repositionable in response to a drag input, and fixed points that are stationary, wherein each of the plurality of points is spaced from another adjacent point in the plurality of points by a predetermined distance on the lockscreen pattern;

detecting drag inputs moving a movable point within the lockscreen pattern;

in response to detecting drag inputs moving the movable point, displaying folding of the displayed lockscreen pattern based on the moving of the movable points;

in response to displaying folding of the displayed lockscreen pattern, changing an arrangement of at least one point included in the folded displayed lockscreen pattern based on a folded area;

determine whether the folded displayed lockscreen pattern that changed the arrangement of the at least one point is matched with a pre-specified unlock condition; and unlocking the electronic device when the folded displayed lockscreen pattern that changed the arrangement of the at least one point is matched with the pre-specified unlock condition stored in the memory.

11. The electronic device of claim 10, wherein the drag inputs are executed responsive to a multi-touch input.

12. The electronic device of claim 10, wherein the pre-specified unlock condition includes pre-specified coordinates of the fixed points in the folded displayed lockscreen pattern that changed the arrangement of the at least one point.

13. The electronic device of claim 12, wherein the pre-specified unlock condition further includes pre-specified coordinates of the movable points in the folded displayed lockscreen pattern that changed the arrangement of the at least one point.

14. The electronic device of claim 10, wherein the folded area is determined based on an initial coordinate of a particular moveable point and a direction in which the particular movable point is moved by the drag input.

15. The electronic device of claim 10, wherein changing the arrangement of the at least one point included in the folded displayed lockscreen pattern the operations further including displaying at least one new movable point on the folded displayed lockscreen pattern.

16. The electronic device of claim 15, wherein the at least one new movable point is disposed along an axis of a fold of the folded displayed lockscreen pattern.

17. The electronic device of claim 15, wherein the at least one new movable point is displayed by converting at least one fixed point into the at least one new movable point.

18. The electronic device of claim 14, wherein the pre-specified unlock condition further comprises pre-specified coordinates of the fixed points with the movable points in the folded displayed lockscreen pattern that changed the arrangement of the at least one point.

* * * * *